United States Patent
Augugliaro et al.

(10) Patent No.: US 11,526,164 B2
(45) Date of Patent: *Dec. 13, 2022

(54) SYSTEM HAVING A PLURALITY OF UNMANNED AERIAL VEHICLES AND A METHOD OF CONTROLLING A PLURALITY OF UNMANNED AERIAL VEHICLES

(71) Applicant: Verity AG, Zurich (CH)

(72) Inventors: Federico Augugliaro, Zurich (CH); Markus Waibel, Zurich (CH); Markus Hehn, Zurich (CH); Raffaello D'Andrea, Wollerau (CH); Luca Gherardi, Oberrieden (CH)

(73) Assignee: Verity AG, Zurich (CH)

( * ) Notice: Subject to any disclaimer, the term of this patent is extended or adjusted under 35 U.S.C. 154(b) by 156 days.

This patent is subject to a terminal disclaimer.

(21) Appl. No.: 17/011,759

(22) Filed: Sep. 3, 2020

(65) Prior Publication Data

US 2020/0401132 A1    Dec. 24, 2020

Related U.S. Application Data

(63) Continuation of application No. 15/898,578, filed on Feb. 17, 2018, now Pat. No. 10,795,352.
(Continued)

(51) Int. Cl.
*G05D 1/00* (2006.01)
*G05D 1/02* (2020.01)
(Continued)

(52) U.S. Cl.
CPC ......... *G05D 1/0027* (2013.01); *B64C 39/024* (2013.01); *G05D 1/0202* (2013.01);
(Continued)

(58) Field of Classification Search
None
See application file for complete search history.

(56) References Cited

U.S. PATENT DOCUMENTS

| 2009/0292407 | A1 | 11/2009 | Minelli et al. |
| 2013/0289858 | A1* | 10/2013 | Mangiat ............... G05D 1/0027 701/117 |

(Continued)

FOREIGN PATENT DOCUMENTS

JP        2016197979 A      11/2016

OTHER PUBLICATIONS

International Search Report and Written Opinion dated May 3, 2018 for Application No. PCT/162018/050893.

*Primary Examiner* — Lail A Kleinman
(74) *Attorney, Agent, or Firm* — Haley Guiliano LLP

(57) ABSTRACT

A system comprising, a plurality of unmanned aerial vehicles and a single controller for controlling said plurality of unmanned aerial vehicles, wherein the single controller is configured such that it can broadcast a command to all of the plurality of unmanned aerial vehicles so that each of the plurality of unmanned aerial vehicles receive the same command; and wherein each of the unmanned aerial vehicles comprise a memory which stores a plurality of predefined flight paths each of which is assigned to a respective command; and wherein each of the unmanned aerial vehicles comprise a processor which can, (i) receive a command which has been broadcasted by the single controller to said plurality of unmanned aerial vehicles, (ii) retrieve from the memory of that aerial vehicle the flight path which is assigned in the memory to that command, and (iii) operate the aerial vehicle to follow the retrieved flight path. There is further provided a corresponding method of controlling a plurality of unmanned aerial vehicles.

38 Claims, 6 Drawing Sheets

Related U.S. Application Data

(60) Provisional application No. 62/460,703, filed on Feb. 17, 2017.

(51) Int. Cl.
*G08G 5/00* (2006.01)
*G08G 5/04* (2006.01)
*B64C 39/02* (2006.01)

(52) U.S. Cl.
CPC .............. *G08G 5/0043* (2013.01); *G08G 5/04* (2013.01); *B64C 2201/141* (2013.01); *B64C 2201/146* (2013.01)

(56) References Cited

U.S. PATENT DOCUMENTS

| | | |
|---|---|---|
| 2014/0236388 A1 | 8/2014 | Wong et al. |
| 2014/0249693 A1* | 9/2014 | Stark .................... B64C 39/024 701/2 |
| 2015/0323931 A1 | 11/2015 | Downey et al. |
| 2016/0117853 A1 | 4/2016 | Zhong et al. |
| 2016/0155339 A1 | 6/2016 | Saad et al. |
| 2016/0285863 A1 | 9/2016 | Canavor et al. |
| 2018/0167131 A1 | 6/2018 | Liu et al. |

* cited by examiner

SYSTEM HAVING A PLURALITY OF UNMANNED AERIAL VEHICLES AND A METHOD OF CONTROLLING A PLURALITY OF UNMANNED AERIAL VEHICLES

CROSS-REFERENCE TO RELATED APPLICATIONS

This application is a continuation of U.S. patent application Ser. No. 15/898,578, filed Feb. 17, 2018, which claims priority to U.S. Provisional Application No. 62/460,703, filed Feb. 17, 2017, which are hereby incorporated by reference herein in their entireties.

FIELD

The present disclosure concerns a system comprising, a plurality of unmanned aerial vehicles which can fly simultaneously to form a swarm of unmanned aerial vehicles, and a single controller for controlling said plurality of unmanned aerial vehicles.

INTRODUCTION

In existing systems which comprise a plurality of unmanned aerial vehicles which are to fly together as a swarm, different radio controllers are used to control each vehicle in the swarm. Disadvantageously, this requires large bandwidth since individual control commands must be sent by each radio controller to its respective vehicle in the swarm i.e. the number of control commands which must be sent correspond to the number of vehicles in the swarm. Additionally, if the swarm is to perform a particular choreography then the sending of commands by the different radio controllers must be synchronized.

A further disadvantage with existing systems is that in order to avoid collision with other vehicles in the swarm, each vehicle in the swarm is required to know the position of every other vehicle in the swarm.

It is an aim of the present disclosure to mitigate or obviate at least some of the above-mentioned disadvantages.

SUMMARY OF THE DISCLOSURE

According to the present disclosure there is provided a system comprising, a plurality of unmanned aerial vehicles and a single controller for controlling said plurality of unmanned aerial vehicles, wherein the single controller is configured such that it can broadcast a command to all of the plurality of unmanned aerial vehicles so that each of the plurality of unmanned aerial vehicles receives the same command; and wherein each of the unmanned aerial vehicles comprises a memory, which stores at least one predefined flight plans each of which is assigned to a respective command; and wherein each of the unmanned aerial vehicles comprises a processor which can, (i) receive a command which has been broadcasted by the single controller to said plurality of unmanned aerial vehicles, (ii) retrieve from the memory of that aerial vehicle the flight plan which is assigned in the memory to that command, and (iii) operate the aerial vehicle to follow the retrieved flight plan.

In an embodiment each of said predefined flight plans comprises a respective flight path which specifies a plurality of spatial coordinates for an aerial vehicle to occupy, wherein each spatial coordinate is associated with a discrete time in a time period.

In an embodiment the spatial coordinates for corresponding discrete times specified in the flight plans associated with the same command in the memories of the different vehicles are different between vehicles, so that no two vehicles will be located at the same spatial coordinates at the same point in time when the vehicles are operated to follow a retrieved flight plan in response to receiving a broadcasted command.

In an embodiment the memory of each vehicle stores a plurality of predefined flight plans each of which is assigned to a respective command.

In an embodiment the single controller is configured to broadcast at least one command to said plurality of unmanned aerial vehicles, wherein said at least one command defines a choreography for the plurality of unmanned vehicles based on the predefined flight plans stored in the memories of the plurality of unmanned vehicles.

In an embodiment the single controller is configured to broadcast, consecutively, a plurality of commands, wherein said plurality of commands define a choreography for the plurality of unmanned vehicles based on the predefined flight plans stored in the memories of the plurality of unmanned vehicles.

Preferably the single controller is configured to broadcast a predefined series of commands. In the preferred embodiment in each predefined series, for adjacent commands in the predefined series the end conditions specified in the flight plan assigned in the memory to one of said commands are equal to start conditions specified in the flight plan assigned in the memory to the next command in said series.

In an embodiment the single controller is configured to broadcast a next command before the plurality of unmanned vehicles have completed their respective flight plans assigned to the last command which the single controller broadcasted.

In an embodiment the processor is further configured to carry out a check to determine if the aerial vehicle can follow the retrieved flight plan without collision with an object, and if the processor determines that the aerial vehicle cannot follow the retrieved flight plan without collision then the processor will operate the aerial vehicle to perform a default action.

In an embodiment the processor is further configured to carry out a check to determine if the aerial vehicle has sufficient resources to follow the retrieved flight plan, and if the processor determines that the aerial vehicle has insufficient resources to follow the retrieved flight plan then the processor will operate the aerial vehicle to perform a default action.

In an embodiment the processor is further configured to detect if no command has been retrieved within a predefined time period, and in response to having not received a command within the predefined time period the processor will operate the aerial vehicle to perform a default action.

In an embodiment the default action comprises following a default flight plan.

In an embodiment the default flight plan comprises a flight path which specifies a plurality of spatial coordinates for an aerial vehicle to occupy, wherein each spatial coordinate is associated with a discrete time in a time period, and wherein the spatial coordinates specified in the default flight plans for corresponding discrete times differs between vehicles, and wherein the spatial coordinates specified in the default flight plans differ to the spatial coordinates for corresponding discrete times specified in said flight plans stored in the memories of the other vehicles in the system, so that no two vehicles will be located at the same spatial coordinates at the same point in time when executing their default flight plan or retrieved flight plan.

In an embodiment the default flight plan comprises the landing of the unmanned aerial vehicle.

In an embodiment the spatial coordinates defining a start of the default flight plan are equal to the spatial coordinates defining a start of the retrieved flight plan, and the spatial coordinates defining an end of the default flight plan are equal to the spatial coordinates defining an end of the retrieved flight plan.

In an embodiment, for each respective command, the flight plans assigned in the memories of all the unmanned aerial vehicles to that command, have same time duration.

In an embodiment a flight plan of at least one unmanned aerial vehicle includes a period wherein the unmanned vehicle hovers in a single position for a period of time so that said flight plan has the same time duration as the flight plans followed by the other unmanned aerial vehicles.

In an embodiment in at least some of the unmanned aerial vehicles there is further stored in the memory of that unmanned aerial vehicle a set of conditions for one or more payloads provided on said unmanned aerial vehicle, and wherein the set of conditions are assigned to a flight plan stored in memory; and wherein the processor is further configured to, retrieve from the memory the set of conditions assigned to the flight plan which that vehicle is about to follow, and to operate the one or more payloads on said unmanned aerial vehicle so that they meet the conditions specified in the retrieved set of conditions.

In an embodiment the set of conditions may comprise any one or more selected from the group comprising, light intensity for a light source provided on the aerial vehicle; an orientation for a light source provided on the aerial vehicle; a color for a light source provided on the aerial vehicle; whether a camera provided on the aerial vehicle should record still images, or whether the camera should record video, or whether the camera should be turned off; and/or a motion profile for an actuator provided on the aerial vehicle.

In an embodiment each of the unmanned aerial vehicles comprise a memory which stores a plurality of flight plan sets, each flight plan set comprising a plurality of predefined flight plans each of which is assigned to a respective command; and wherein the single controller is further configured such that it can send a command, which is addressed to a single unmanned aerial vehicle, which identifies one of the set of flight plans which that single unmanned aerial vehicle is to use.

In an embodiment the plurality of unmanned aerial vehicles all have the same plurality of flight plan sets, and that the number of flight plan sets is at least equal to the number of unmanned aerial vehicles in the system.

In an embodiment the user may control the single controller i.e. the single controller may be slaved to a user. The user can select which command(s) the single controller should broadcast, and then initiate the single controller to send the selected command. The user can operate the single controller to send commands which, for example, cause the aerial vehicles to start, stop, pause, to perform a default action, or to shut down the vehicle(s).

In an embodiment the system further comprises a master controller which can communicate with the single controller, and wherein the master controller can send commands to the single controller which cause the single controller to broadcast a selected command to the plurality of unmanned aerial vehicles.

In an embodiment the master controller is a controller which is configured to control the motion of objects on a stage, and wherein the commands which the master controller send to the single controller depend on the position which the objects occupy on the stage.

In an embodiment the controller is further configured to send a localization signal which can be used to determine the distance between said single controller and each vehicle.

It should be understood that in each of the embodiments described in this application, optionally each vehicle may further comprise a respective receiver, which can receive a command which has been broadcast by the single controller, and can pass the received broadcasted command to the processor for processing. In each respective vehicle the respective receiver is preferably operably connected to the processor so that the receiver can pass received broadcasted commands to the processor for processing. It should also be understood that in each of the embodiments described in this application, optionally each vehicle may further comprise a clock. Most preferably the processor of each vehicle further comprises a clock which can measure time. In each respective vehicle the respective clock of that vehicle is preferably operably connected to the processor, so that the processor can read the time measurement on the clock or so that the clock can send its time measurement to the processor. It should also be understood that the single controller of any of the embodiments described in this application, may optionally further comprise a clock which can measure time; in such an embodiment the clock is preferably integral to the single controller. In a variation of the embodiment the clock is separate to the single controller but is operable connected to the single controller (via a wired or wireless connection for example); in such an embodiment the system comprises the clock which is operably connected to the single controller, so that the single controller can read the time measurement on the clock, or so that the clock can send its time measurement to the single controller. The clock of each respective vehicle may be synchronized to a reference clock (such as a system-wide reference clock); this may be achieved by providing synchronization information in a command broadcasted by the single controller; upon receipt of such a command the synchronization information is used by the clock to synchronize the clock of that vehicle to the reference clock. This may be achieved by including standard clock synchronization data in the broadcasted command (for example using a Reference Time Broadcast synchronization method or the Time Protocol defined in the Internet Protocol Suite), by including a custom synchronization payload data (for example, by embedding the current time of the reference clock in GPS time format into the broadcasted command; the processor of each vehicle can then measure its local time when the command is received, compute the difference to the time of the reference clock, and correct its local time by the difference). The reference clock can be provided by a clock connected to the single controller (for example, a Real Time Clock module or a Quartz oscillator), or the single controller can receive an external time signal (for example, the single controller may receive a time signal from a GPS receiver, or from a receiver connected to the United States National Institute of Standards and Technology's HF short-wave radio). Alternatively, the clock of each respective vehicle may be synchronized to a reference clock through a signal that is broadcast by one or multiple transmitters that are separate from the controller (for example the current reference clock time can be calculated using signals received from Global Navigation Satellite Systems, or by receiving terrestrial longwave radio time signals; the local clock of the vehicle can then be set to the reference clock time). Preferably, the single controller is then also equipped to synchronize to the same reference clock. The above methods can be used to synchronize the time (by adjusting the current time of the vehicle clock), the rate of the clock (by adjusting the rate of the clock such that the time difference between two reception events, observed on a vehicle, matches the time difference indicated by the two received time information), or both.

In an embodiment the command broadcasted by the single controller further comprises a starting time or a delay. Preferably the starting time specifies the time when the processor should execute the flight plan. The starting time may comprise an absolute time with respect to a time of a reference clock (such as a system-wide reference clock; a reference clock is a clock to which both a clock of the single controller and the clocks of the vehicles are synchronized to). Preferably the delay specifies a period which the processor of a vehicle should wait, after said vehicle (preferably the processor of that vehicle) has received the broadcasted signal, before executing the flight plan.

The processor may be configured to determine if a starting time specified in a broadcasted command which has been received, is within a predefined time range. The processor may be further configured to operate the vehicle to perform a default action if the determined difference is outside of said predefined time range.

The processor may be configured to determine if a delay time specified in a broadcasted command which has been received, is within a valid range. The processor may be further configured to operate the vehicle to perform a default action if the determined difference is outside of said valid range.

In an embodiment the processor is configured to receive a command which has been broadcast by the single controller and determines if that command is valid based on the last flight plan which that vehicle executed. Preferably the processor is configured to receive a command, and retrieve from the memory the flight plan which is assigned to that command which was received; the processor then compares the starting conditions specified in the retrieved flight plan with the end conditions specified in the flight plan which the aerial vehicle last executed; the processor initiates the vehicle to execute the retrieved flight plan only if starting conditions specified in the retrieved flight plan are equal to the end conditions specified in the flight plan which the aerial vehicle last executed. Preferably if starting conditions specified in the retrieved flight plan are not equal to the end conditions specified in the flight plan which the aerial vehicle last executed, the processor initiates the vehicle to execute a default action.

In another embodiment the command(s) broadcasted by the single controller contain at least one flight plan; and wherein the processor of each aerial vehicle is further configured to i) retrieve the at least one flight plan from the broadcasted command after it has been received at the vehicle ii) and store the retrieved flight plan in the memory of that aerial vehicle. The processor might further be configured to carry out a check to determine if any of the at least one flight plan meets predefined conditions, and to store the flight plans that meet one or more predefined conditions; said one or more predefined conditions are preferably stored in the memory of that aerial vehicle. The predefined conditions may, for example, be dependent on the current position of the vehicle. For example, a predefined condition may be that the difference between the starting position specified in a retrieved flight plan and the current position of the vehicle must be within a predefined threshold, in order for the processor to store the retrieved flight plan. In such a case the processor of the vehicle compares the starting position of a retrieved flight plan to the current position of the vehicle (the current position of the vehicle can be determined using suitable means in the art such as GPS). If the distance (preferably Euclidean distance) between the starting position of a retrieved flight plan and current position of the vehicle is smaller than a predefined threshold, the processor determines that this specific predefined condition is met.

In another example a predefined condition may comprise a condition that the charging station to which the vehicle is connected matches the charging station identifier contained in the flight plan in order for the processor to execute the retrieved flight plan: For example, the position can refer to a specific charging position of a vehicle; Specifically, a vehicle might be connected to charging station number '1' and the flight plans may further contain a charging station identifier; The processor would then store the flight plan in memory only if the charging station to which the vehicle is connected matches the charging station identifier contained in the flight plan.

In another example a predefined condition may comprise a condition that is dependent on a physical or electrical characteristic of the vehicle. For example, a predefined condition may comprise the condition that a vehicle type identifier which is contained in the retrieved flight plan must be the same as the vehicle type identifier stored in memory of that vehicle, in order for the processor to execute the retrieved flight plan. In this case the flight plan may further specify a vehicle type identifier. If the processor determines that the vehicle type is of the same type specified in the vehicle type identifier (e.g. by comparing the vehicle type identifier contained in the retrieved flight plan, to a vehicle type identifier stored in memory), it stores the flight plan in said memory.

In another example a predefined condition may comprise a condition that is dependent on a parameter stored in the memory of the vehicle. For example, a predefined condition may comprise the condition that a value for a specific parameter specified in the flight plan is the same as the value for the same specific parameter stored in the vehicles memory, in order for the processor to store the retrieved flight plan. For example, the flight plan may further specify a value for a specific parameter. If the processor determines that the value for the specific parameter specified in the flight plan is the same as the one stored in the vehicles memory, it stores the flight plan in memory. The processor of each respective vehicle may be further configured to send an acknowledgement signal if it stored any of the at least one flight plan. Said acknowledgement signal is preferably sent to the single controller.

According to a further aspect of the present disclosure there is provided a method of controlling a plurality of unmanned aerial vehicles, the method comprising the steps of,
using a single controller to broadcast a command to all of the plurality of unmanned aerial vehicles so that each of the plurality of unmanned aerial vehicles receive the same command; and
at each of the unmanned aerial vehicles,
receiving at the processor of that unmanned aerial vehicle the command which has been broadcasted by the single controller to said plurality of unmanned aerial vehicles;
retrieving from a memory of that aerial vehicle, wherein said memory which stores a plurality of predefined flight plans each of which is assigned to a respective command, the flight plan which is assigned in the memory to that command which has been received at the processor; and operating the aerial vehicle to follow the retrieved flight plan.

BRIEF DESCRIPTION OF THE DRAWINGS

The disclosure will be better understood with the aid of the description of embodiments given by way of example only and illustrated by the figures, in which.

DETAILED DESCRIPTION

Figure 1:
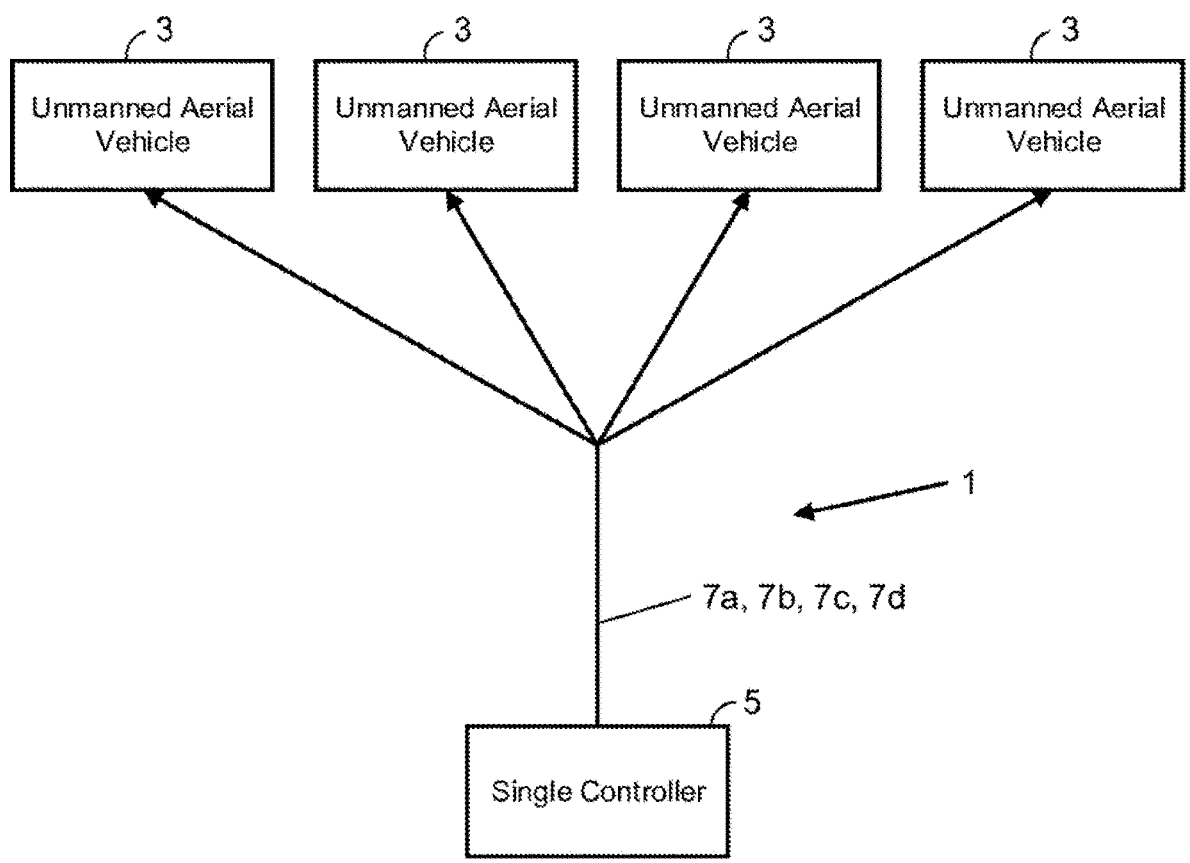
FIG. 1 is a block diagram illustrating a system according to an embodiment of the present disclosure.

FIG. 1 is a block diagram illustrating a system 1 according to an embodiment of the present disclosure.

The system 1 comprises a plurality of unmanned aerial vehicles 3 and a single controller 5 for controlling said plurality of unmanned aerial vehicles 3. FIG. 1 shows four unmanned aerial vehicles 3 however it will be understood that the system could have any number of vehicles greater than one.

The single controller 5 is configured such that it can broadcast a command 7a-d to all of the plurality of unmanned aerial vehicles 3 so that each of the plurality of unmanned aerial vehicles 3 receives the same command 7a-d. The controller may be implemented on a processor (e.g. the processor of a computer) which is connected to a transmitter, wherein the transmitter is used to transmit the commands 7a-d which is received from said processor. In another embodiment the transmitter is connected to the processor (via a wired connection or wireless connection), and is further connected (via a wired connection or wireless connection) to a plurality of other transmitters in a network, so that said transmitter can transmit commands to the other transmitters in the network. In one embodiment each of said other transmitters is connected (via a wired connection or wireless connection) to one or more additional transmitters, so that each of said other transmitter can transmit commands which they receive to said one or more additional transmitters. The transmitter which is connected to the processor and the plurality of other transmitters (and/or said one or more additional transmitters) define a network of transmitters; the network of transmitters can be used for localization. Thus, the transmitter which is connected to the processor can transmit commands to the other transmitters, and the other transmitters in turn broadcast the commands which they receive to the one or more additional transmitters; in this way commands can be sent through the network; this allows commands to be sent to transmitters and vehicles which would otherwise be out of the range of the transmitter which is connected to the processor. In yet a further embodiment, the controller may be implemented on a plurality of processors (e.g. respective processors of a plurality of computers) which are each connected to a plurality of transmitters to form a network.

Figure 2:
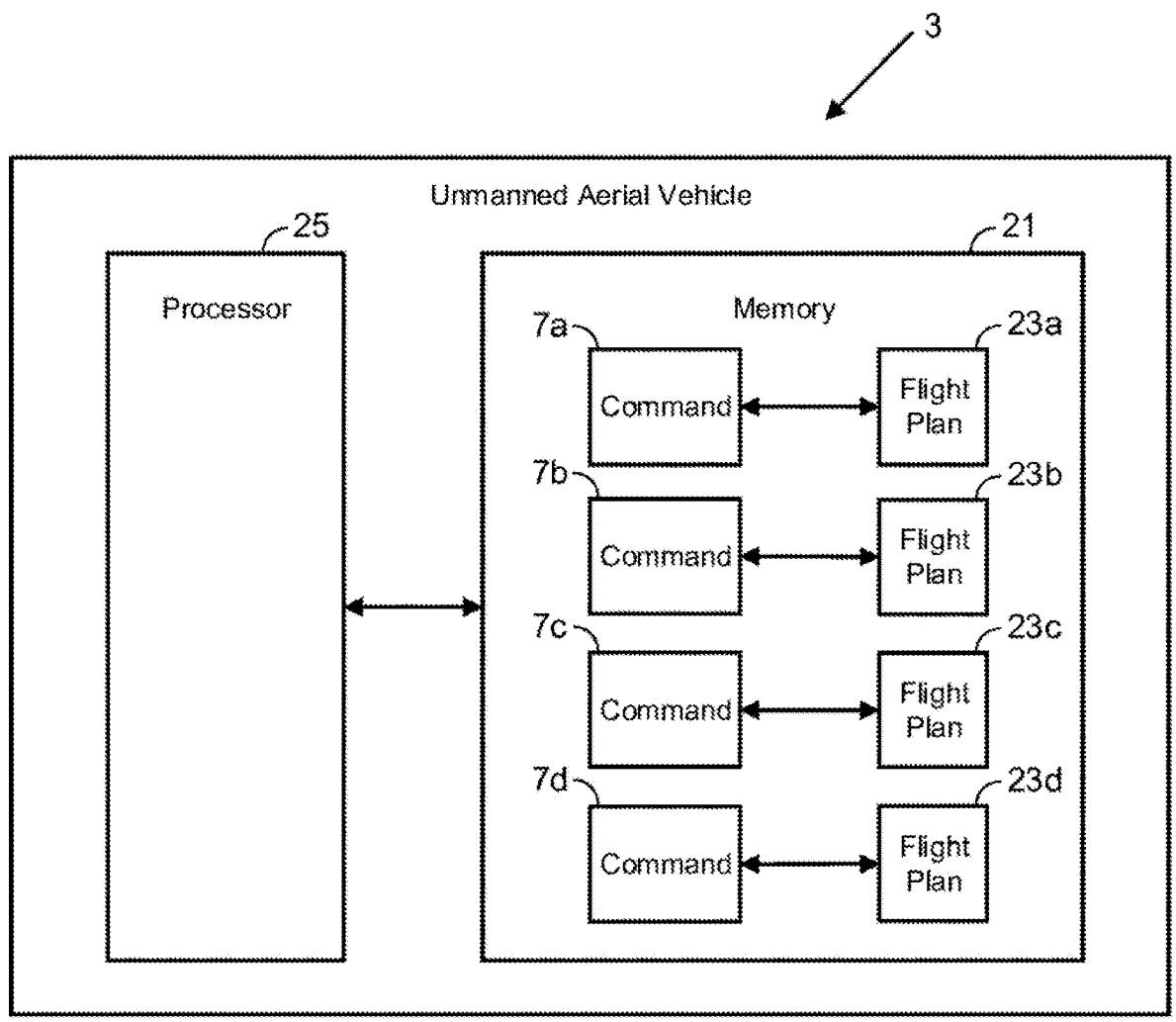
FIG. 2 is a block diagram illustrating and example of an unmanned aerial vehicle which can be used in the system shown in FIG. 1.

FIG. 2 is a block diagram illustrating an example of an unmanned aerial vehicle 3 which can be used in the system 1 shown in FIG. 1. Each unmanned aerial vehicle 3 comprises a memory 21 which stores a plurality of predefined flight plans 23a-d each of which is assigned to a respective command 7a-d.

Each plan 23a-d will comprise at least a flight path 32a-d, wherein a 'flight path' is a series of spatial coordinates for an aerial vehicle 3 to occupy, wherein each spatial coordinate is associated with a discrete time in a time period. It should be understood that in some embodiments the flight plan may further comprise velocity, accelerations, orientations, and/or time values, for the vehicle; for example, the flight plan may specify that a flight path should be travelled at a velocity of 20 km/hr. It should be understood that the flight plan may comprise any suitable parameters or values for the vehicle, but is will always at least include a series of spatial coordinates.

In an embodiment, each flight plan 23-d may further comprise a series of orientations for the aerial vehicle 3 wherein each orientation is associated with a discrete time in a time period (for example, in an embodiment each flight plan 23-d may further comprise an orientation for the aerial vehicle 3 for each of the respective discrete times of a corresponding flight path 23a-d, so as to provide a respective orientation for the vehicle for each respective spatial coordinate in that respective flight path 23a-d). In yet a further embodiment each flight plan 23-d may further comprise any one or more of velocity, acceleration, and/or yaw orientation for the vehicle 3 for discrete times over a time period. In an embodiment the unmanned aerial vehicle 3 may comprise a processor 25 which is configured to determine the derivative of the spatial coordinates which are specified in a flight plan, with respect to time, so as to determine for each spatial coordinate, a velocity and/or acceleration for the unmanned aerial vehicle 3. In an embodiment each unmanned aerial vehicle 3 may comprise a processor 25 which is configured to interpolate any of said spatial coordinates, orientations, velocity, acceleration, and/or yaw orientation, between two discrete times so as to determine spatial coordinates, orientations, velocity, acceleration, and/or yaw orientation for the vehicles during the period between said two discrete times.

It should be understood that for each command 7a-d the flight plan 23a-d assigned to that command 7a-d will differ between vehicles 3. For example, if the system 1 has three aerial vehicles 3 then, in the memory of the first aerial vehicle a first command 7a will be assigned to a first flight plan 23a-d, and in the memory of the second aerial vehicle the same first command 7a will be assigned to a second flight plan 23a-d which is different to the first flight plan 23a-d, and in the memory of the third aerial vehicle the same first command 7a will be assigned to a third flight plan 23a-d which is different to both the first and second flight plan 23a-d. Specifically, for each command 7a-d the flight plan 23a-d assigned to that command 7a-d will differ between vehicles 3 in the senses that they will specify different spatial coordinates for each of the same discrete time instances; this ensures that none of aerial vehicles 3 will occupy the same spatial coordinates at the same time instant. In the preferred embodiment for each command 7a-d the flight plan 23a-d assigned to that command 7a-d will differ between vehicles 3 so that there will be at least a threshold distance between each of the aerial vehicles 3 at the same time instant. For example for each command 7*a-d* the flight paths of the flight plan 23*a-d* assigned to that command 7*a-d* will differ between the vehicles; for example if the system 1 has three aerial vehicles 3 then, in the memory of the first aerial vehicle a first command 7*a* will be assigned to a first flight plan 23*a-d* which has a first flight path 32*a-d* which specifies a series of spatial coordinates for the first aerial vehicle 3 to occupy at each of a plurality of predefined discrete times in a time period; and in the memory of the second aerial vehicle the same first command 7*a* will be assigned to a second flight plan 23*a-d* which has second flight path which specifies a series of spatial coordinates for the second aerial vehicle 3 to occupy at each of said plurality of predefined discrete times in said time period, wherein, each of the spatial coordinates specified in the second flight path are different to the spatial coordinates specified in the first flight path for each said plurality of predefined discrete times (i.e. the same discrete times instances in the first and second flight paths have different spatial coordinates; preferably each of the spatial coordinates specified in the second flight path differ to the spatial coordinates specified in the first flight path for each said plurality of predefined discrete times by a threshold distance) so that the first and second aerial vehicles will not collide if they execute their respective first and second flight plan 23*a-d* in response to receiving the first command 7*a*. For example, the first flight path will include a first time instant having first spatial coordinates associated with it; and the second flight path will include said same first time instant but having second spatial coordinates associated with it, whereby the first and second spatial coordinates are different, and preferably differ by a predefined threshold distance. Likewise, in the memory of the third aerial vehicle the same first command 7*a* will be assigned to a third flight plan 23*a-d* which has third flight path which specifies a series of spatial coordinates for the third aerial vehicle 3 to occupy at a plurality of predefined discrete times in a time period, wherein, each of the spatial coordinates specified in the third flight path are different to the spatial coordinates specified in the first and second flight paths, for each said plurality of predefined discrete times (i.e. the same discrete times instances in the first, second and third flight paths have different spatial coordinates; preferably each of the spatial coordinates specified in the third flight path differ to the spatial coordinates specified in the first and second flight paths for each said plurality of predefined discrete times by a threshold distance), so that the first, second and third aerial vehicles will not collide if they execute their respective first, second and third flight plans 23*a-d* in response to receiving the first command 7*a*. The different flight paths specified in the different flight plans differ in this manner between vehicles for all commands. In other words in no two flight plans assigned to the same command in the memories 21 of two different vehicles, specifies the same spatial coordinates for the same discrete time instances. This ensures that vehicles can execute respective flight plans specified in respective flight plans assigned in the respective memories with a command, in response to receiving a command broadcasted by the single controller, without the risk of colliding with one another.

Each unmanned aerial vehicle 3 further comprises a processor 25 which can, (i) receive a command 7*a-d* which has been broadcasted by the single controller 5 to all of the plurality of unmanned aerial vehicles 3 in the system 1, (ii) retrieve from the memory 21 of that aerial vehicle the flight plan 23*a-d* which is assigned in the memory 21 of that aerial vehicle to that command 7*a-d*, and (iii) operate the aerial vehicle to follow the retrieved flight plan 23*a-d*.

For example, if the single controller 5 broadcasts a particular command 7*b* to all of the unmanned aerial vehicles 3 in the system 1, then at each aerial vehicle 3 the processor 25 of that aerial vehicle 3 will receive the broadcasted command 7*b* and will retrieve from the memory 21 of that aerial vehicle the corresponding flight plan 23*a-d* which is assigned in the memory 21 to the command 7*b*. The processor 25 of each of the respective unmanned aerial vehicles 3 in the system 1 will then operate that respective unmanned aerial vehicle to fly along a flight path specified in the flight plan 23*a-d* which was retrieved from the memory 21 of that respective unmanned aerial vehicle e.g. the processor 25 will operate the propellers, and/or wing flaps, of the vehicle so that the vehicle flies along said flight path. As mentioned, the spatial coordinates specified in the flight paths of the flight plans 23*a-d* of the different vehicles, which correspond to the same command, are different for each point in time specified in the flight plan, so that no vehicles will occupy the same position at the same time; this ensure that the vehicles do not collide with each other when they execute the respective flight paths in response to receiving the broadcasted command 7*b*.

The plurality of unmanned aerial vehicles 3 of the system 1 can be flown simultaneously to perform a predefined choreography without the risk of collision. The single controller 5 is configured to broadcast, consecutively, a plurality of commands 7*a-d*, wherein said plurality of commands define a predefined choreography for the plurality of unmanned vehicles 3 based on the predefined flight plans 23*a-d* which are stored in the memories 21 of the plurality of unmanned vehicles 3. For example, the single controller 5 may broadcast a first command 7*a* to all of the unmanned aerial vehicles 3 in the system 1 in which case all of the unmanned aerial vehicles 3 will fly along the respective flight path specified in the flight plan 23*a-d* associated in their respective memories 21 with the first command 7*a* (i.e. the flight plan 23*a-d* assigned in the memories 21 with the first command 7*a*); then the single controller 5 may broadcast a second command 7*b* to all of the unmanned aerial vehicles 3 in the system 1 in which case all of the unmanned aerial vehicles 3 will fly along the respective flight path of the flight plan 23*a-d* associated in their respective memories 21 with the second command 7*b*; then the single controller 5 may broadcast a third command 7*c* to all of the unmanned aerial vehicles 3 in the system 1 in which case all of the unmanned aerial vehicles 3 will fly along the respective flight path of the flight plan 23*a-d* associated in their respective memories 21 with the third command 7*c*; and finally the single controller 5 may broadcast a fourth command 7*d* to all of the unmanned aerial vehicles 3 in the system 1 in which case all of the unmanned aerial vehicles 3 will fly along the respective flight path of the corresponding flight plan associated in their respective memories 21 with the fourth command 7*d*. In some cases, the commands 7*a-d* may be sent in any particular order to achieve a desired choreography for the unmanned aerial vehicles 3 in the system 1 to perform. Typically, the final command which the single controller 5 will broadcast will be a command which is associated in the memory 21 of at least one vehicle with a flight plan 23*a-d* which specifies a flight path which brings that respective vehicle to land. Typically, the first command which the single controller 5 will broadcast will be a command which is associated in the memory 21 of at least one vehicle with a flight plan 23*a-d* which specifies a flight path which comprises a takeoff from a landed position.

In the most preferred embodiment the single controller is configured to broadcast a predefined series of commands. In an embodiment a plurality of predefined series of commands are provided, and the single controller may broadcast any one or more of said predefined series. For example, plurality of predefined series of commands may comprise a first predefined series being a 'first command 7a—third command 7c—fourth command 7d', a second predefined series being a 'first command 7a—second command 7b—fourth command 7d', and a third predefined series being a 'first command 7a—second command 7b—third command 7c'. In one embodiment the single controller 5 can send any of the predefined series of commands 7a-d only; in the aforementioned example the single controller 5 may send either the first, second or third predefined series of commands 7a-d only; in embodiment the single controller 5 will not send any series of commands which are not in the predefined series of commands.

Most preferably, in each respective predefined series of commands, the boundary conditions of the respective flight plans 23a-d associated in the memories 21 of the aerial vehicles with consecutive commands are equal: For example, consider the first predefined series which is first command 7a—third command 7c—fourth command 7d; in a vehicle (preferably in 'all' of the aerial vehicles) a first flight plan 23a which is assigned in the memory 21 to the first command 7a is compatible with the a third flight plan 23c which is assigned in the memory 21 to the third command 7c, which allows the third command 7c to be a valid command to broadcast after the first command 7a has been broadcast; specifically the final position coordinates specified in the flight path provided in the first flight plan 23a (i.e. the position coordinates specified for the final time instant provided in the flight plan of the first flight plan 23a), and/or the final velocity specified in the first flight plan 23a (i.e. the velocity specified for the final time instant provided in the first flight plan 23a), and/or final acceleration specified in the first flight plan 23a (i.e. the acceleration specified for the final time instant provided in the first flight plan 23a), and/or the final yaw specified in the first flight plan 23a (i.e. the yaw specified for the final time instant provided in the first flight plan 23a), are equal to respective start position coordinates specified in the flight path of the third flight plan 23c (i.e. the position coordinates specified for the first time instant provided in the flight plan of the third flight plan 23c), and/or the start velocity specified in the third flight plan 23c (i.e. the velocity for the first time instant provided in the third flight plan 23c), and/or start acceleration specified in the third flight plan 23c (i.e. the velocity for the first time instant provided in the third flight plan 23c), and/or the start yaw specified in the third flight plan 23c (i.e. the yaw specified for the first time instant provided in the third flight plan 23c). Likewise in said vehicle (preferably in 'all' of the aerial vehicles) the third flight plan 23c which is assigned in the memory 21 to the third command 7a is compatible with the fourth flight plan 23d which is assigned in the memory 21 to the fourth command 7c, which allows the fourth command 7d to be a valid command to broadcast after the third command 7c has been broadcast; specifically the final position coordinates specified in the flight path provided in the third flight plan 23c (i.e. the position coordinates specified for the final time instant provided in the flight plan of the third flight plan 23c), and/or the final velocity specified in the third flight plan 23c (i.e. the velocity specified for the final time instant provided in the third flight plan 23c), and/or final acceleration specified in the third flight plan 23c (i.e. the acceleration specified for the final time instant provided in the third flight plan 23c), and/or the final yaw specified in the third flight plan 23c (i.e. the yaw specified for the final time instant provided in the third flight plan 23c), is equal to the respective start position coordinates specified in the flight path of the fourth flight plan 23d (i.e. the position coordinates specified for the first time instant provided in the flight plan of the fourth flight plan 23d), and/or the start velocity specified in the fourth flight plan 23d (i.e. the velocity for the first time instant provided in the fourth flight plan 23d), and/or first acceleration specified in the fourth flight plan 23d (i.e. the velocity for the first time instant provided in the fourth flight plan 23d), and/or the start yaw specified in the fourth flight plan 23d (i.e. the yaw specified for the first time instant provided in the fourth flight plan 23d).

The above-described compatibility between conditions specified in the first flight plan 23a and third flight plan 23c and compatibility between the conditions specified in the third flight plan 23c and fourth flight plan 23d allows the first predefined series which is first command 7a—third command 7c—fourth command 7d to be valid and executable by the aerial vehicle(s). If for example the final position coordinates in the first flight plan 23a were different to the start position coordinates in the third flight plan 23c then the third command 7c (which is assigned in the memory to the third flight plan 23c) could not be sent consecutive to the first flight plan 23a.

Even though the above example considers the first predefined series only, it should be understood that all of the predefined series of commands are similar: in the second predefined series which is 'first command 7a—second command 7b—fourth command 7d', in the vehicle the first flight plan 23a which is assigned in the memory 21 to the first command 7a is compatible with the a second flight plan 23b which is assigned in the memory 21 to the second command 7b, which allows the second command 7b to be a valid command to broadcast after the first command 7a has been broadcast, and the second flight plan 23b which is assigned in the memory 21 to the second command 7b is compatible with the fourth flight plan 23d which is assigned in the memory 21 to the fourth command 7d, which allows the fourth command 7d to be a valid command to broadcast after the second command 7b has been broadcast. In the third predefined series which is 'first command 7a—second command 7b—third command 7c', in the vehicle the first flight plan 23a which is assigned in the memory 21 to the first command 7a is compatible with the a second flight plan 23b which is assigned in the memory 21 to the second command 7b, which allows the second command 7b to be a valid command to broadcast after the first command 7a has been broadcast, and the third flight plan 23c which is assigned in the memory 21 to the third command 7c is compatible with the third flight plan 23c which is assigned in the memory 21 to the third command 7c, which allows the third command 7c to be a valid command to broadcast after the second command 7b has been broadcast.

Thus, for each of the predefined series of command, the order of commands in the series is such that, consecutive commands lead to consecutively executed flight plans wherein the start conditions of one of the flight plans are equal to the end conditions of the previously executed flight plan (in another embodiment the start conditions of one of the flight plans do not need to be precisely equal to the end conditions of the previously executed flight plan—a slight difference may be tolerated; for example the start conditions of one of the flight plans do will differ from the end conditions of the previously executed flight plan by a predefined tolerance amount). In the most preferred embodiment for each of the predefined series of command, the order of commands in the series is such that, consecutive commands lead to consecutively executed flight plans wherein the start conditions of one of the flight plans are equal to the end conditions of the previously executed flight plan, for all of the plurality of aerial vehicles.

In another embodiment the processor 25 receives a command 7a-d which has been broadcast by the single controller 5 and determines if that command is valid based on the last flight plan 23a-d which that vehicle executed. Specifically, the processor 25 receives a command 7a-d, and retrieves from the memory 21 the flight plan 23a-d which is assigned to that command 7a-d which was received; the processor 25 compares the starting conditions specified in the retrieved flight plan 23a-d with the end conditions specified in the flight plan 23a-d which the aerial vehicle last executed; the processor 25 initiates the vehicle to execute the retrieved flight plan 23a-d only if starting conditions specified in the retrieved flight plan 23a-d are equal to the end conditions specified in the flight plan 23a-d which the aerial vehicle last executed, otherwise the processor 25 initiates the vehicle to execute a default action.

For example, consider that the last flight plan which the aerial vehicle executed was a first flight plan 23a; the processor 25 of the vehicle then receives a second command 7b (for example) which has been broadcasted by the single controller 5; the processor 25 retrieves from the memory a second flight plan 23b which is assigned to the second command 7b; the processor 25 compares the final position coordinates specified in the flight path provided in the first flight plan 23a (which is the flight plan which the vehicle last executed) (i.e. the position coordinates specified for the final time instant provided in the flight plan of the first flight plan 23a), and/or the final velocity specified in the first flight plan 23a (i.e. the velocity specified for the final time instant provided in the first flight plan 23a), and/or final acceleration specified in the first flight plan 23a (i.e. the acceleration specified for the final time instant provided in the first flight plan 23a), and/or the final yaw specified in the first flight plan 23a (i.e. the yaw specified for the final time instant provided in the first flight plan 23a), to the respective start position coordinates specified in the flight path of the second flight plan 23b (i.e. the position coordinates specified for the first time instant provided in the flight plan of the second flight plan 23b), and/or the start velocity specified in the second flight plan 23b (i.e. the velocity for the first time instant provided in the second flight plan 23b), and/or start acceleration specified in the second flight plan 23b (i.e. the velocity for the first time instant provided in the second flight plan 23b), and/or the start yaw specified in the second flight plan 23b (i.e. the yaw specified for the first time instant provided in the second flight plan 23b). Only if the final position coordinates specified in the flight path provided in the first flight plan 23a are equal to the start position coordinates specified in the flight path of the second flight plan 23b, and/or the final velocity specified in the first flight plan 23a is equal to the start velocity specified in the second flight plan 23b, and/or final acceleration specified in the first flight plan 23a is equal to the start acceleration specified in the second flight plan 23b, and/or the final yaw specified in the first flight plan 23a is equal to start yaw specified in the second flight plan 23b, does the processor 25 deem the broadcasted second command 7b to be valid, and initiates the aerial vehicle to executed said retrieved second flight plan 23b.

If for example the final position coordinates specified in the flight path provided in the first flight plan 23a are not equal to the start position coordinates specified in the flight path of the second flight plan 23b, and/or the final velocity specified in the first flight plan 23a is not equal to the start velocity specified in the second flight plan 23b, and/or final acceleration specified in the first flight plan 23a is not equal to the start acceleration specified in the second flight plan 23b, and/or the final yaw specified in the first flight plan 23a is not equal to start yaw specified in the second flight plan 23b, then the processor 25 deems the broadcasted second command 7b to be invalid, and initiates the aerial vehicle to executed a default action.

Even though the above example described the processor 25 performing comparisons of the conditions in the first and second flight plans 23a,b assigned to respective first and second commands 7a,b it should be understood that the processor 25 performs a similar comparison for all of the commands it receives. It should also be understood that the processor 25 of all of the vehicles are configured as described above.

It should be understood the in one embodiment the processor 25 of each vehicle, determines if a broadcasted command is valid based on the last flight plan 23a-d which that vehicle executed; in another embodiment there is provided one or more predefined series of commands for the single controller to broadcast to the vehicles (as described above); and in yet a further embodiment a combination of the processor 25 which determines if a broadcasted command is valid based on the last flight plan 23a-d which that vehicle executed and one or more predefined series of commands for the single controller to broadcast is provided, so that the processor 25 performs a check to ensure that the broadcasted predefined series of commands are valid.

In the most preferred embodiment the single controller 5 is configured to broadcast the next command before the plurality of unmanned vehicles 3 have completed the respective flight path of the flight plan 23a-d assigned to the last command which the single controller 5 broadcast. For example, the single controller 5 will preferably broadcast the second command 7b to all of the unmanned aerial vehicles 3 in the system 1 before the unmanned aerial vehicles 3 have completed the respective flight paths of the flight plans 23a-d associated with the first command 7a. Likewise the single controller 5 will preferably broadcast the third command 7c to all of the unmanned aerial vehicles 3 in the system 1 before the unmanned aerial vehicles 3 have completed their respective flight paths of the flight plans 23a-d associated in their respective memories 21 with the second command 7b etc.

In a preferred embodiment the processor 25 of each vehicle 3 is configured to carry out a check to determine if the aerial vehicle can follow the flight path specified in the flight plan 23a-d associated in the memory 21 with a received command 7a-d, without collision with an object. Preferably the processor 25 is configured carry out a check to determine if the aerial vehicle can execute the flight path specified in a flight plan 23a-d without collision with an object. Preferably the processor 25 of a vehicle is configured such that, when the vehicle receives a command 7a-d which has been broadcast by the single controller 5, the processor 25 will then determine if the vehicle 3 can execute the flight path of the flight plan 23a-d associated in the memory 21 with a received command 7a-d without collision with an object.

In one embodiment, a vehicle 3 will have stored in its memory 21, predetermined spatial coordinates defining the position of stationary objects present in the environment of the vehicle (these predetermined spatial coordinates for objects may have determined dynamically, or predetermined, using any suitable means); when the vehicle 3 receives a command which has been broadcast by the single controller 5 the processor 25 determines the distance (preferably Euclidean distance) between, each of the spatial coordinates specified in the flight path of the flight plan 23a-d which is associated in the memory 21 with the received command, and each of the predetermined spatial coordinates defining the position of stationary objects stored in the memory 21; if any of the determined distances are below a threshold distance value, then the processor 25 will determine that a collision with an object will occur if the vehicle executes the flight path of the flight plan 23a-d which is associated in the memory 21 with the received command.

In another embodiment, a vehicle comprises a time-of-flight camera, a sonar, and/or a laser, and/or any suitable sensor, which can be used to scan the environment of the vehicle 3 and determine spatial coordinates defining the position of stationary objects present in the environment (the use of a time-of-flight camera, a sonar, and/or a laser to determine spatial coordinates defining the position of stationary objects is known in the art). When the vehicle 3 receives a command which has been broadcast by the single controller 5 the processor 25 determines the distance (preferably Euclidean distance) between, each of the spatial coordinates specified in the flight path of the flight plan 23a-d which is associated in the memory 21 with the received command, and each of the spatial coordinates defining the position of stationary objects determined by the time-of-flight camera, sonar, and/or a laser; if any of the determined distances are below a threshold distance value, then the processor 25 will determine that a collision with an object will occur if the vehicle executes the flight path of the flight plan 23a-d which is associated in the memory 21 with the received command.

In yet another embodiment, the command 7a-d which the single controller 5 broadcasts to the vehicles 3 will further comprise spatial coordinates defining the position of stationary objects present in the environment; when the vehicle 3 receives a command which has been broadcast by the single controller 5 the processor 25 determines the distance (preferably Euclidean distance) between, each of the spatial coordinates specified in the flight path of the flight plan 23a-d which is associated in the memory 21 with the received command, and each of the spatial coordinates specified in broadcasted command 7a-d that was received; if any of the determined distances are below a threshold distance value, then the processor 25 will determine that a collision with an object will occur if the vehicle executes the flight path of the flight plan 23a-d which is associated in the memory 21 with the received command.

In yet a further embodiment, the command 7a-d which the single controller 5 broadcasts to the vehicles 3 will further comprise spatial coordinates defining the position of objects present in the environment and also movement information (e.g. direction of movement and/or speed of movement) of the objects; when the vehicle 3 receives a command which has been broadcast by the single controller 5 the processor 25 uses the movement information to calculate a series of spatial coordinates defining the positions of the objects over a time period corresponding to the time period of the flight path of the flight plan 23a-d associated in the memory 21 with the received command; then the processor 25 determines the distance (preferably Euclidean distance) between, each of the spatial coordinates specified in the flight path of the flight plan 23a-d which is associated in the memory 21 with the received command, and each of the spatial coordinates in the calculated series of spatial coordinates defining the positions of the objects; if any of the determined distances are below a threshold distance value, then the processor 25 will determine that a collision with an object will occur if the vehicle executes the flight path of the flight plan 23a-d which is associated in the memory 21 with the received command.

In each of the above-mentioned examples, if the processor 25 determines that the aerial vehicle 3 cannot execute the flight path of the flight plan 23a-d which is associated in the memory 21 with the received command without collision, then the processor 25 will operate the aerial vehicle 3 to perform a default action. For example, when the single controller 5 broadcasts the first command 7a to all of the unmanned aerial vehicles 3 in the system 1, the processor 25 of each unmanned aerial vehicles 3 will retrieve the corresponding flight plan 23a-d which is associated in its memory 21 with the first command 7a. However, before the processor 25 of the respective unmanned aerial vehicle 3 operates that respective unmanned aerial vehicle 3 to fly along the flight path specified in the retrieved flight plan 23a, it will first check to determine if the aerial vehicle 3 can follow the flight path without collision with an object. Only if the processor 25 determines that the aerial vehicle 3 can follow the flight path without collision with an object will the processor 25 operate that respective unmanned aerial vehicle to fly along the flight path specified in the retrieved flight plan 23a. However, if the processor 25 determines the aerial vehicle 3 will collide with an object by following the flight path specified in the retrieved flight plan 23a, then the processor 25 will operate the aerial vehicle to perform a default action. The default action maybe that the processor 25 operates the vehicle 3 to follow a default flight plan wherein the default flight plan is a flight plan 23a-d associated in the memory 21 with another command 7a-d, and/or may be that the processor 25 operates the vehicle 3 to follows a default flight plan whereby the vehicle hovers only, and/or may be that the processor 25 operates the vehicle 3 to follow a default flight plan which brings the vehicle to another position, and/or may be that the processor 25 operates the vehicle 3 to follow a default flight plan which brings the vehicle to land (in other words where the final spatial coordinates specified in the default flight path are spatial coordinates representing a position at ground level or a position on a landing platform such as the surface of stage/table/object). The default flight plans will be stored in the respective memories 21 of the respective vehicles 3.

It should be understood that said default flight plan will comprises at least a 'flight path', which is a series of spatial coordinates for an aerial vehicle 3 to occupy, wherein each spatial coordinate is associated with a discrete time in a time period. It should be understood that the spatial coordinates specified in the flight path of the default flight plan will differ from the spatial coordinates for corresponding discrete times specified in the flight paths of flight plans 23a-d stored in the memories of the other respective vehicles; likewise the spatial coordinates specified in the flight path of the default flight plan will differ from the spatial coordinates for corresponding discrete times specified in the flight paths of other default flight plans stored in the memories of the other respective vehicles. This ensures that no two vehicles will be at the same spatial coordinates as the same point in time; thus vehicles can execute safely the default flight plans which it has stored in its memory 21, without the risk of the vehicle colliding with other vehicles 3 which are executing either a default flight plan or flight plan 23a-d which they have stored in their respective memories 21.

In another embodiment, each default flight plan may further comprise a series of orientations for the aerial vehicle 3 wherein each orientation is associated with a discrete time in a time period. In yet a further embodiment each default flight plan may further comprise any one or more of velocity, acceleration, and/or yaw orientation for the vehicle 3 for discrete times over a time period. In an embodiment the unmanned aerial vehicle 3 the processor 25 may be configured to determine the derivative of the spatial coordinates which are specified in a default flight plan, with respect to time, so as to determine for each spatial coordinate, a velocity and/or acceleration for the unmanned aerial vehicle 3. In an embodiment the processor 25 may be configured to interpolate any of said spatial coordinates, orientations, velocity, acceleration, and/or yaw orientation, between two discrete times of a default flight plan so as to determine spatial coordinates, orientations, velocity, acceleration, and/or yaw orientation for the vehicles during the period between said two discrete times.

In an embodiment a different default action is assigned to each flight plan 23*a-d*. Most preferably a different default flight plan is assigned to each flight plan 23*a-d*. For example, if the vehicle receives a first command 7*a* and the processor 25 subsequently retrieves from the memory 21 the flight plan 23*a* associated with a first command 7*a* and determines that by following the flight path specified in the retrieved flight plan 23*a* the vehicle would collide with an object, then the default action maybe that the processor 25 operates the vehicle to follow a first default flight plan (which may involve bringing the vehicle to land). If for example the vehicle received a first command 7*a* and had executed the flight plan 23*a* associated with that first command 7*a*, and then receives a second command 7*b* and the processor 25 subsequently retrieves from the memory the flight plan 23*b* associated with a second command 7*b* and determines that by following the flight path specified in the retrieved flight plan 23*b* the vehicle would collide with an object, then the default action maybe that the processor 25 operates the vehicle to follow a second default flight plan (which may involve bringing the vehicle to land), wherein the second default flight plan may be different to the first default flight plan (For example, the respective first and second default flight paths may specify different spatial coordinates for corresponding discrete times. For example, the final spatial coordinate of the flight path specified in the first default flight plan may be different to the final spatial coordinate of flight path specified in the second default flight plan so that landing positions of the first and second flight plans are different). Thus, in this embodiment the memory 21 of each vehicle will have a respective default action associated with each of its stored flight plans 23*a-d* and that respective default action will be performed if the corresponding retrieved flight plan 23*a-d* would result in the vehicle colliding with an object.

In an embodiment if, in any of the above-mentioned examples, the processor 25 determines that a collision with an object will occur if the flight path assigned in the memory 21 to a received command is executed, then the processor 25 will initiate the vehicle to carry out a default action which is dependent on the last flight plan which the vehicle executed. In other words there may be a different default action to execute depending on the on the last flight plan which the vehicle executed. For example, if the vehicle last executed a first flight plan 23*a* then the default action maybe to follow a first default flight plan, and if the vehicle last executed a second flight plan 23*a* then the default action maybe to follow a second default flight plan.

In a further embodiment the processor 25 is further configured to carry out a check to determine if the aerial vehicle 3 has sufficient resources to execute a retrieved flight plan 23*a-d* (e.g. determine if there is sufficient power in a battery of the vehicle 3 to enable the vehicle to navigate the full distance of the flight path specified in the retrieved flight plan 23*a-d*). When the vehicle 3 receives a command 7*a-d* which has been broadcast by the single controller 5 the processor 25 retrieves from the memory 21 of the vehicle, the flight plan 23*a-d* which is associated in the memory 21 with the retrieved command 7*a-d*; the processor 25 then analyzes the retrieved flight plan 23*a-d* using a predefined metric equation which provides a cost value indicated of the cost of executing the retrieved flight plan 23*a-d*; the processor 25 then compares the cost value to a threshold cost value, to determine if the vehicle 3 has sufficient resources to enable the vehicle 3 to execute the retrieved flight plan 23*a-d*. Said threshold cost value can be a predefined fixed value (e.g. available motor power), or, the processor 25 may be further configured to calculate the threshold cost value based on the amount of resources currently available in the vehicle (e.g. remaining battery).

For example, in order to check whether there are enough battery resources available in a vehicle 3 to perform a retrieved flight plan 23*a-d*, the processor 25 determines the total amount of power required to execute the flight plan (e.g. the total amount of power required for the vehicle to fly the flight path specified in the flight plan 23*a-d*). This might, for example, be achieved by including in the flight plan the total amount of power that was required in a previously executed test flight. As another example, a simple model (e.g. a mathematical model) of the vehicle power consumption might be used: the sum over time of the vehicle's accelerations according to the flight plan multiplied by the vehicle mass and a motor-specific parameter. The parameter (e.g. motor-specific parameter) can for example be derived by testing the power consumption on a load cell. Using any suitable means the processor 25 will measure the current battery state (e.g. how much power is remaining in the battery) (this may also be done continuously as the vehicle is flying). For example, to measure the current battery state of charge the processor 25 may measure the amount of current that flows out of the battery and integrating it in time (Current integration method, also known as Coulomb counting). For example the processor 25 may determine the battery power required for the vehicle to travel the flight plan 23*a-d* (which is assigned in the memory 21 to a received command), and compare said determined required battery power to the battery power remaining in a battery of the vehicle; if the required batter power exceeds the battery power remaining in a battery of the vehicle then the processor 25 will determine that the vehicle does not have sufficient resources to execute the flight plan. In another example, in order to check whether the flight path can be executed by the vehicle, the vehicle extracts the maximum acceleration required by the flight path (which is either given explicit, or can be extracted by taking the derivative of the position over time, as mentioned above) and verify that this does not exceed a predefined threshold (e.g. the predefined threshold may be the maximum acceleration which motors of the vehicle can provide).

If the processor 25 determines that the aerial vehicle 3 has insufficient resources to follow the retrieved flight path 23*a-d* then the processor 25 will operate the aerial vehicle 3 to perform a default action.

For example, when the single controller 5 broadcasts the first command 7*a* to all of the unmanned aerial vehicles 3 in the system 1, the processor 25 of each unmanned aerial vehicles 3 will retrieve the corresponding flight plan 23a which is associated in the memory 21 with that first command 7a. However, before the processor 25 of the respective unmanned aerial vehicle 3 operates that respective unmanned aerial vehicle to fly along the flight path specified in the retrieved flight plan 23a, it will first check to determine if the aerial vehicle has sufficient resources to follow the retrieved flight plan 23a. For example the processor 25 will determine the amount of power which the aerial vehicle will require in order to travel the flight path specified in the retrieved flight plan 23a; the processor 25 will then check the amount of power remaining in the battery of the aerial vehicle 3. If the amount of power remaining in the battery of the aerial vehicle is less than the amount of power which the aerial vehicle will require in order to travel the flight path specified in the retrieved flight plan 23a (e.g. is insufficient to allow the vehicle to navigate along the full flight path specified in the flight plan 23a), then the processor 25 will operate the aerial vehicle 3 to perform a default action. The default action may be that the processor 25 operates the vehicle to follow another predefined default flight plan which requires less power (preferably in this case, a plurality of different default flight plans may be available, and the processor 25 will first determine the power required to execute each of the different default flight plans, and will select the default flight plan which requires an amount of power which corresponds to the amount of power remaining in the battery of the aerial vehicle, or which requires less than the amount of power remaining in the battery of the aerial vehicle; the processor 25 will then operate vehicle to execute said selected default flight plan. If there is more than one default flight plan which requires an amount of power which corresponds to the amount of power remaining in the battery of the aerial vehicle, or which requires less than the amount of power remaining in the battery of the aerial vehicle, then the processor 25 will select the default flight plan which requires the least amount of power to execute and will operate the vehicle to execute the selected default flight plan). It should be understood that the default action maybe that the processor 25 operates the vehicle to follow a flight plan which has a flight path which brings the vehicle to land.

In a further embodiment the processor 25 is further configured to detect if no command has been received from the single controller 5 within a predefined time period; in response to having not received a command within the predefined time period the processor 25 will operate the aerial vehicle to perform a default action. In this embodiment each vehicle will further comprise a clock (preferable provided in the processor 25); after a flight plan 23a-d has been executed then the processor 25 initiates the clock to begin counting; the processor 25 continuously compares the value on the clock with a predefined time threshold value and if the value of the clock exceeds the predefined time threshold value then the processor 25 operates the aerial vehicle to perform a default action. If the vehicle receives a command 7a-d before the clock reaches the predefined time threshold value, then the processor 25 stops the clock, executes the flight plan 23a-d assigned in the memory 21 to that received command, and then resets the clock; thus if the processor 25 receives a command 7a-d before the clock exceeds the predefined time threshold value then the clock will be stopped before it exceeds the predefined time threshold value, accordingly the processor 25 will operate the vehicle to perform a default action only if the vehicle has not received a command before the clock reaches a value which exceeds the predefined time threshold value. Preferably during the execution of a flight plan 23a-d the clock does not increment; most preferably as soon as the vehicle receives a command the processor 25 stops the clock, the flight plan 23a-d associated with the received command 7a-d is executed, and only after the flight plan 23a-d has been executed does the processor 25 reset the clock and initiate the clock to being counting from the reset value.

For example, the processor 25 may be configured to detect if no command has been received from the single controller 5 within a predefined time period of 20 seconds; in this example the predefined time threshold value is '20'; after a vehicle has completed a flight plan 23a-d the processor 25 resets the clock to a value of '0' for example, and initiates the clock to being counting from the reset value; the clock in this example increments a value of '1' per second. The processor 25 continuously compares the value of the clock with the predefined time threshold value '20'; if the clock reaches a value of '20' then the processor 25 detects that the vehicle 3 has not received any command 7a-d from the single controller 5 within the predefined time threshold value and so the processor 25 will operate the aerial vehicle 3 to perform a default action. Typically, the default action would be that the processor 25 operates the vehicle to follow a default flight plan 23a-d which brings the vehicle 3 to land. The single controller 5 will broadcast commands frequently; if the processor 25 has not received a command within '20' seconds it could mean that the aerial vehicle 3 is out of the range of the single controller 5, or that the processor 25 has a fault; or that the single controller 5 has a fault; in all cases the control of the flight of the aerial vehicle 3 is compromised and thus, for safety, the processor 25 will operate the vehicle 3 to land.

In the above-mentioned embodiments it is preferred that the flight plans 23a-d assigned/associated in the memories 21 of all of the unmanned aerial vehicles 3 to a respective command 7a-d all have the same time duration. This facilitates controlling the aerial vehicles 3 using a command which is broadcast to all aerial vehicles 3 from a single controller 5.

It should be understood that a flight plan 23a-d may specify a flight path which includes a portion wherein the vehicle hovers in a single position for a period of time so as to ensure that the flight path has the same duration as other flight paths of other flight plans which the other vehicles 3 in the system 1 are travelling/executing. For example, in response to the single controller 5 broadcasting a first command 7a, a first vehicle 3 may be following a first flight plan 23a-d which requires the vehicle to fly from a first position to a second position which takes the first vehicle '25' seconds, and a second vehicle 3 may be following a second flight plan 23a-d which requires the vehicle to fly from a third position to a fourth position which takes the second vehicle '20' seconds. In order to ensure that the first and second flight plans have the same time duration the second flight plan 23a-d will include a five second period whereby the second vehicle will hover at a single position (or the speed of the second vehicle will be slowed so that it takes the second vehicle 25 seconds to fly from the third position to the fourth position) so that it takes 25 seconds for the second vehicle to complete the second flight plan 23a-d.

In an embodiment the single controller 5 is further configured to generate and send a localization signal that can be used to determine the distance between the single controller 5 and each vehicle 3; in a further embodiment the localization signal that can be used to determine the position (e.g. the position of the vehicles with respect to one another, and/or the position of the vehicles with respect to the single controller 5, and/or the position of the vehicles with respect to a predefined reference position) of each vehicle in the system 1. Importantly, in the most preferred embodiment the controller is configured to broadcast the localization signal, using the same hardware, and/or using the same frequency, and/or using the same channel, over which it sends the commands 7*a-d*. The localization signal can be sent either consecutively to the command signals 7*a-d*, or may be send simultaneously to the command signals, or the commands 7*a-d* and the localization signal may be contained in the same signal (e.g. a data structure that contains the command 7*a-d* and the information required for localization). In this particular embodiment, each vehicle 3 will preferably further comprise a directional antenna or an antenna array which can receive the localization signal. Determining the distance between the single controller 5 and each vehicle 3 and/or determining the location of each vehicle in the system 1 can be achieved using known techniques in the art. For example, the vehicle and the controller may have synchronized clocks, the localization signal can contain a time indicating when the localization signal is sent as time-stamped by the single controller 5 before it is sent; when the vehicle receives the localization signal the timestamp on the localization signal is compared to the time which the vehicle has on its clock, this allows the vehicle to determine the time of flight of the signal, thus allowing the processor 25 to determine the distance between the vehicle and the controller knowing that the signal travelled at the speed of light. Another way to determine distance is to use the signal power, to do this, the strength of the localization signal as originally transmitted by the single controller 5 is known to the vehicle (e.g. stored in vehicle memory or is part of the transmitted signal); by measuring the strength of the localization signal received at the vehicle, and using a Free-space Path Loss model, the distance to the between the single controller 5 and the vehicle can be estimated. In yet a further example the vehicle can determine its position by triangulation; the vehicle receives localization signals from at least three transmitters belonging to the controller, and estimates the distance to each of the three transmitters based on the received localization signals (e.g. based on the strength of the receiving localization signals); knowing the locations of these three transmitters (e.g. stored in vehicle memory or part of the transmitted signal) the vehicle determine its location based on the estimated distance it is from each of the three transmitters.

Figure 3:
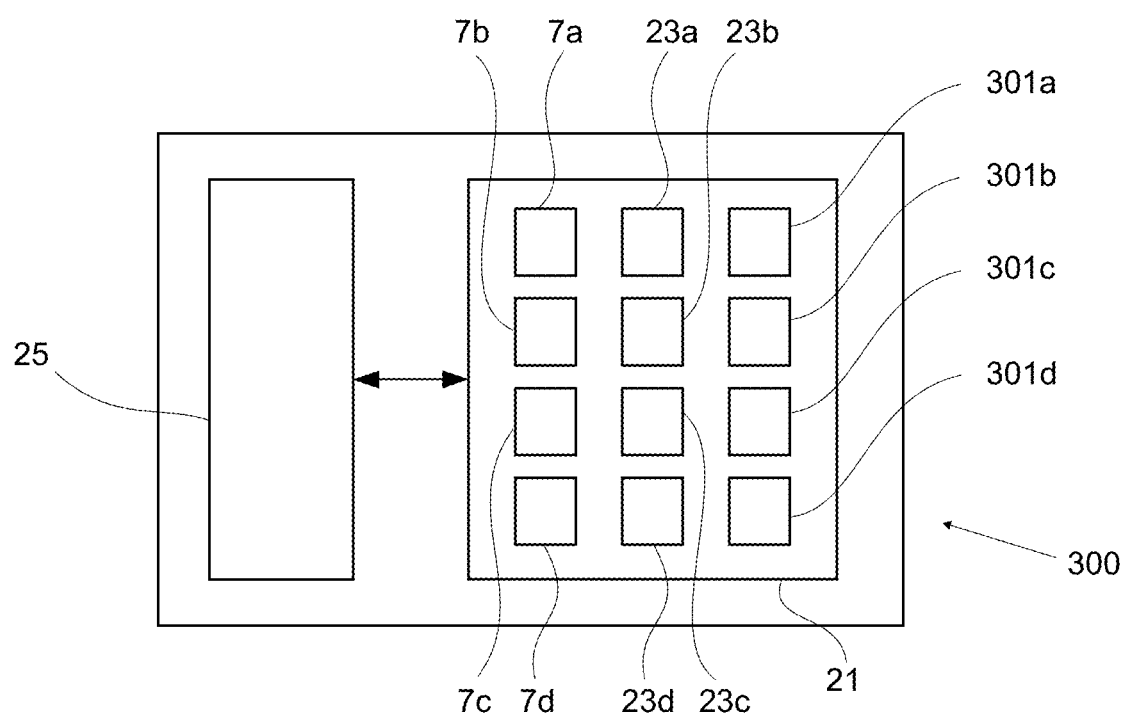
FIG. 3 is a block diagram illustrating an example of another type of unmanned aerial vehicle which could be used in the system of FIG. 1.

FIG. 3 is a block diagram illustrating an example of another type of unmanned aerial vehicle 300 which could be used in the system 1 shown in FIG. 1. In this example, in at least some of the unmanned aerial vehicles there is further stored in the memory 21 a plurality of sets of conditions 301*a-d* for one or more payloads provided on said unmanned aerial vehicle 300, and wherein each set of conditions 301*a-d* is assigned to respective flight plan 23*a-d* stored in memory 21 (or, in another embodiment, each set of conditions 301*a-d*assigned to a respective command 7*a-d* stored in memory 21). In this embodiment the processor 25 is further configured to, retrieve from the memory 21 of that aerial vehicle 301 the set of conditions 301*a-d* assigned to the flight plan 23*a-d* which that vehicle is about to follow, and to operate the one or more payloads on said unmanned aerial vehicle 300 so that they meet the conditions specified in the retrieved set of conditions 301*a-d*. For example, in response to the single controller 5 broadcasts a third command 7*c* the processor 25 will retrieve from the memory 21 the flight plan 23*c* associated with the third command 7*c*; the processor 25 will then check to ensure that the vehicle 300 can travel the flight path specified in the retrieved flight plan 23*c* without colliding with an object and will also check to ensure that the vehicle 301 has sufficient resources to travel the retrieved flight plan 23*c* (for this example it is assumed that the processor 25 determines that there is no risk of collision with an object and that the vehicle has sufficient resources); the processor 25 will also retrieve from the memory 21 the set of conditions 301*c* which are associated with the retrieved flight plan 23*c* (or, in another embodiment, retrieve from the memory 21 the set of conditions 301*c* which are associated, in the memory 21 with the retrieved third command 7*c*). The processor 25 then configures the payload(s) provided on the vehicle 3 so that they meet the conditions specified in the retrieved set of conditions 301*c*; configuring the payload(s) provided on the vehicle 3 so that they meet the conditions specified in the retrieved set of conditions 301*c* may require the processor 25 to operate the payloads in a specific manner during the execution of the retrieved flight path 23*c*.

The payloads provided on the vehicle may take any suitable form; for example the vehicle may comprise, one or more light sources, and/or a camera, and/or a housing (which can store confetti for example) which has a door which can be selectively opened to release the stored confetti, and/or an actuator. The sets of conditions 301*a-d* may specify light intensity/light intensities profile for the one or more light sources provided on the vehicle; and/or orientation profile for a light source provided on the aerial vehicle; and/or color profile for a light source provided on the aerial vehicle; and/or may specify if a camera provided on the aerial vehicle should record still images, or whether the camera should record video, or whether the camera should be turned on or off, and/or may specify that the door of the housing should be opened; and/or a motion profile for an actuator provided on the aerial vehicle.

The conditions might be time-dependent; in other words the conditions over time may be specified. For example, the light intensity can have an intensity profile that varies over time; and/or the motion profile for an actuator provided on the aerial vehicle over time.

The conditions may also be dependent on a predefined situation or occurrence of a predefined event. For example, a condition may specify a light intensity for a situation when an object is within a predefined distance of the vehicle. One particular example would be in a stage performance application where a condition may specify a light intensity for a light source (payload) provided on a vehicle, if an actor/performer is moving towards the vehicle (in this example the movement of the actor/performer towards the vehicle may be detected using suitable means such as cameras or sensors provided on the vehicle); in this case once it is detected that the actor/performer is moving towards the vehicle the processor 25 adjusts the light intensity of the light source to the light intensity specified in the condition. In another example the condition could be an adaptation of the flight path which the vehicle is currently executing in the case of a particular situation or occurrence e.g. the adaptation of the flight path should be implemented if it is detected that the actor/performer is moving towards the vehicle so as to avoid the vehicle colliding with the actor/performer.

The set of conditions may further specify a particular point in time, and/or a position along the flight path of the retrieved flight plan 23*a-d* at which the payload(s) should have a particular condition. For example, a set of conditions 301*a-d* may specify that at 20 seconds after the vehicle has begun to travel the retrieve flight plan 23*a-d* that the light sources on the vehicle should have an intensity of 20 Lux; in which case the processor 25 will configure the light sources to have an intensity of 20 Lux only 20 seconds after the vehicle 3 has begun to travel the retrieved flight plan 23*a*-*d*.

In a further embodiment of the present disclosure, in at least some of the unmanned aerial vehicles there is further stored in the memory 21 a plurality of sets of parameters for the vehicle; each set of parameters is assigned to respective flight plan 23*a*-*d* stored in memory 21. In this embodiment the processor 25 is further configured to, retrieve from the memory 21 of that aerial vehicle 301 the set of parameters assigned to the flight plan 23*a*-*d* which that vehicle is about to follow, and to adjust its own configuration according to the retrieved parameters. For example, each vehicle may have a controller which can control the flight of the vehicle to follow a flight plan which the vehicle is to execute; for example the flight plan may specific a target velocity for the vehicle; the controller in the vehicle will control the flight effectors (such as propellers, flaps, elevons, wings) (for example the controller in the vehicle will control speed of rotation of the propellers on the vehicle) so that the vehicles velocity is brought to and maintained at said target velocity. Likewise the flight plan may specific a target position i.e. spatial coordinates (or a plurality of target positions (i.e. spatial coordinates), for a respective plurality of time instances) for the vehicle to occupy; the controller in the vehicle will control the flight effectors (e.g. controls the speed of rotation of the propellers, and/or the direction of rotation of the propellers, and/or and the tilt of the angular propellers on the vehicle) so that the vehicle is moved to and is maintained at said target position. Likewise the flight plan may specific a target velocity for the vehicle over time; the controller in the vehicle will control the flight effectors (e.g. controls the speed of rotation of the propellers, and/or the direction of rotation of the propellers, and/or and the tilt of the angular propellers on the vehicle) so that the vehicle is moved at said target velocity specified in the flight plan. Likewise the flight plan may specific a target acceleration for the vehicle over time; the controller in the vehicle will control the flight effectors (e.g. controls the speed of rotation of the propellers, and/or the direction of rotation of the propellers, and/or and the tilt of the angular propellers on the vehicle) so that the vehicle is moved at said target acceleration specified in the flight plan. Likewise the flight plan may specific a target yaw for the vehicle over time; the controller in the vehicle will control the flight effectors (e.g. controls the speed of rotation of the propellers, and/or the direction of rotation of the propellers, and/or and the tilt of the angular propellers on the vehicle) so that the vehicle is moved to said target yaw specified in the flight plan.

The controller in the flight vehicle may be configured to implement any suitable control law to achieve such control (i.e. to maintain the vehicle flight at the target speed, and/or target position, and/or target acceleration, and/or target yaw, specified in the flight plan); for example, the controller may be configured to implement PID control. Parameters (such as the 'gains' of the controller) of the control law (e.g. the 'gains' of the PID control law) may be dependent on the flight plan which is to be executed; for example the a first flight plan 23*a* may have a first set of PID control parameters (e.g. a first set of gains) associated with it in the memory 21 and a second flight plan 23*b* may have a second set of PID control parameters (e.g. a second set of gains) associated with it in the memory 21 etc.; if the vehicle is to execute the second flight plan 23*b* the second set of PID control parameters (e.g. the second set of gains) are retrieved from the memory 21 and the controller uses these second set of PID control parameters when implementing PID control (e.g. the controller uses the second set of gains when implementing the PID control law); if the vehicle is to execute the first flight plan 23*a* the first set of PID control parameters (e.g. the first set of gains) are retrieved from the memory 21 and the controller uses these first set of PID control parameters when implementing PID control (e.g. the controller uses the first set of gains when implementing the PID control law). Having different control parameters associated in the memory 21 with the different flight plans allows to take into account local conditions such as poor GPS reception, artistic effects, large errors in the vehicle onboard position estimate.

Figure 4:
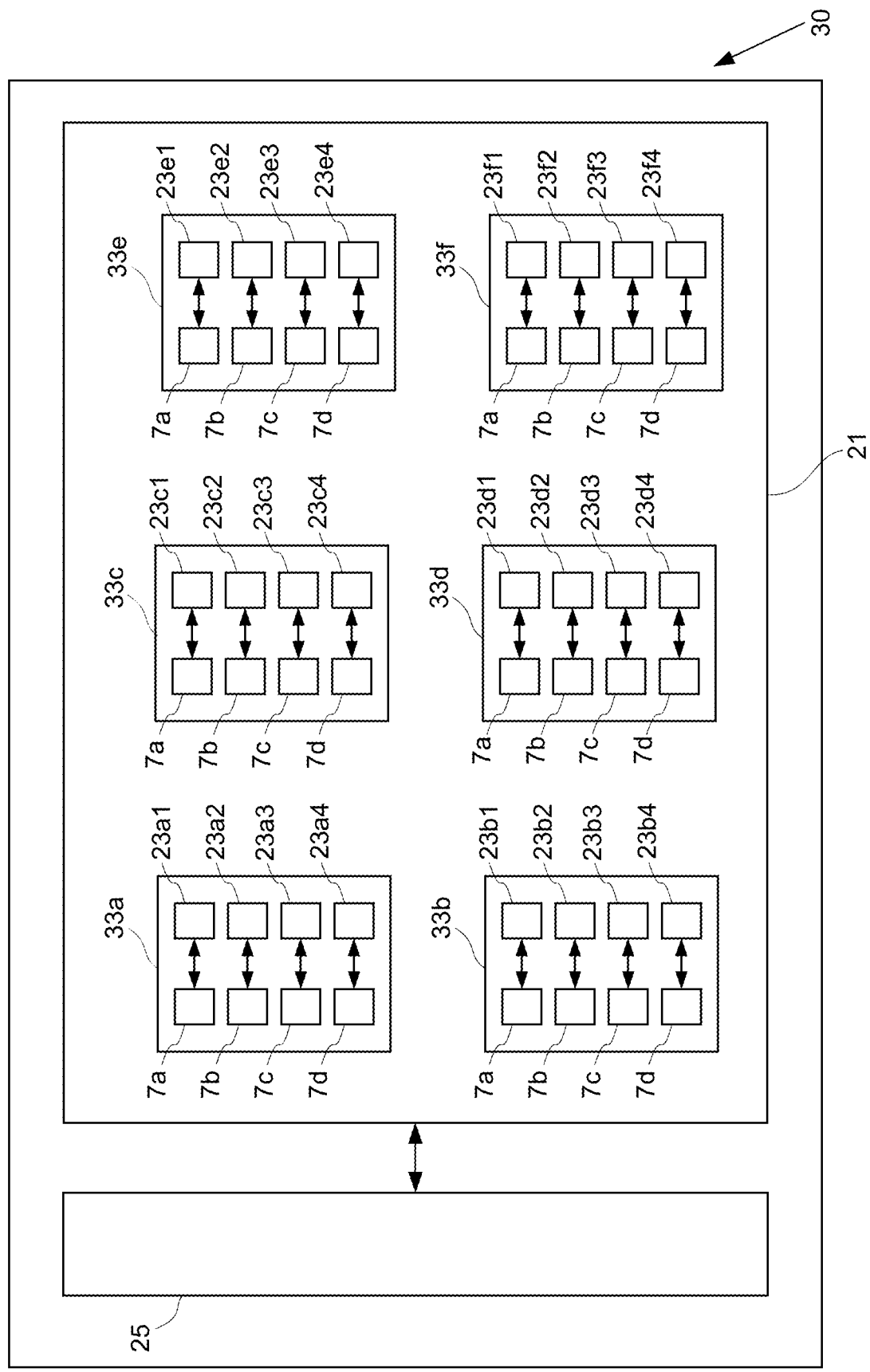
FIG. 4 is a block diagram illustrating an example of another type of unmanned aerial vehicle which could be used in the system of FIG. 1.

FIG. 4 is a block diagram illustrating and example of another type of unmanned aerial vehicle 30 which could be used in the system 1 shown in FIG. 1. Each unmanned aerial vehicle 30 comprises a memory 21 which stores a plurality of flight plan sets 33*a*-*f*, each flight plan set 33*a*-*f* having predefined flight plans 23*a*1-*a*4, 23*b*1-*b*4, 23*c*1-*c*4, 23*d*1-*d*4, 23*e*1-*e*4, 23*f*1-*f*4, assigned to a respective command 7*a*-*d*. The predefined flight plans 23*a*1-*a*4, 23*b*1-*b*4, 23*c*1-*c*4, 23*d*1-*d*4, 23*e*1-*e*4, 23*f*1-*f*4 differ between the sets 33*a*-*f*. In this embodiment all of the plurality of unmanned aerial vehicles 30 in the system will have the same plurality of flight plan sets 33*a*-*f*. Also, the number of flight plan sets 33*a*-*d* is equal to, or greater than, the number of unmanned aerial vehicles 30 in the system 1.

In this embodiment the single controller 5 is configured such that it can send a command, which is addressed to a single unmanned aerial vehicle 30, which identifies one of the sets of flight plan 33*a*-*f* which that single unmanned aerial vehicle 30 is to use in operation. For example, each unmanned aerial vehicle 30 will have a vehicle ID which is unique to the vehicle ID's of all the other unmanned aerial vehicles 30 in the system 1; before the plurality of unmanned aerial vehicles 3 are flown the single controller 5 will broadcast to all of the unmanned aerial vehicles 3 a command which comprises a list of the vehicle ID's and a set of flight paths 33*a*-*f* associated with each respective vehicle ID listed, which that respective single unmanned aerial vehicle 30 having that respective vehicle ID is to use in operation; upon receiving the broadcasted list, the processor 25 of each unmanned aerial vehicle 30 scans the list to locate its vehicle ID and then retrieves from its respective memory 21, the set of flight plans 33*a*-*f* which is associated in the list with its vehicle ID. In another example, before the plurality of unmanned aerial vehicles 3 are flown the single controller 5 will send consecutive individual commands to each of the respective unmanned aerial vehicle 30 in the system 1 indicating which set of flight paths 33*a*-*f* that vehicle 30 should use; for example the single controller 5 will send a first command to a first vehicle 30 indicating that that first vehicle should use the set of flight plans 33*c*, will send a second command to a second vehicle 30 indicating that that second vehicle should use the set of flight plans 33*b* etc . . . . Preferably each vehicle 30 will use a different set of flight plans 33*a*-*f* so as to prevent the vehicles from colliding during flight. In one embodiment the number of sets of flight plans 33*a*-*f* is preferably equal to, or greater than, the number of vehicles 30 in the system 1; for example, if there are four vehicles 30 in the system then the single controller 5 may instruct a first vehicle to use a first set of flight plans 33*a*, a second vehicle to use a second set of flight plans 33*b*, third vehicle to use a third set of flight paths 33*c*, and the fourth vehicle to use a fourth set of flight plans 33*d*. It should be understood that while preferably the number of sets of flight plans 33*a*-*f* is preferably equal to, or greater than, the number of vehicles 30 in the system 1, it is not necessary that all of the vehicles 30 in the system each all store all of the sets of flight plans 33a-f in their respective memories; for example, there may be a total of '30' vehicles in the system and '30' sets flight plans 33a-f provided; however '15' of the vehicles 30 may have '15' different sets of flight plans stored in their respective memories 21, while the other '15' vehicles 30 may have the other '15' different sets of flight plans stored in their respective memories 21; thus in this example the vehicles 30 in the system 1 each have only some of the available flight plans 33a-f stored in their respective memories.

Figure 5:
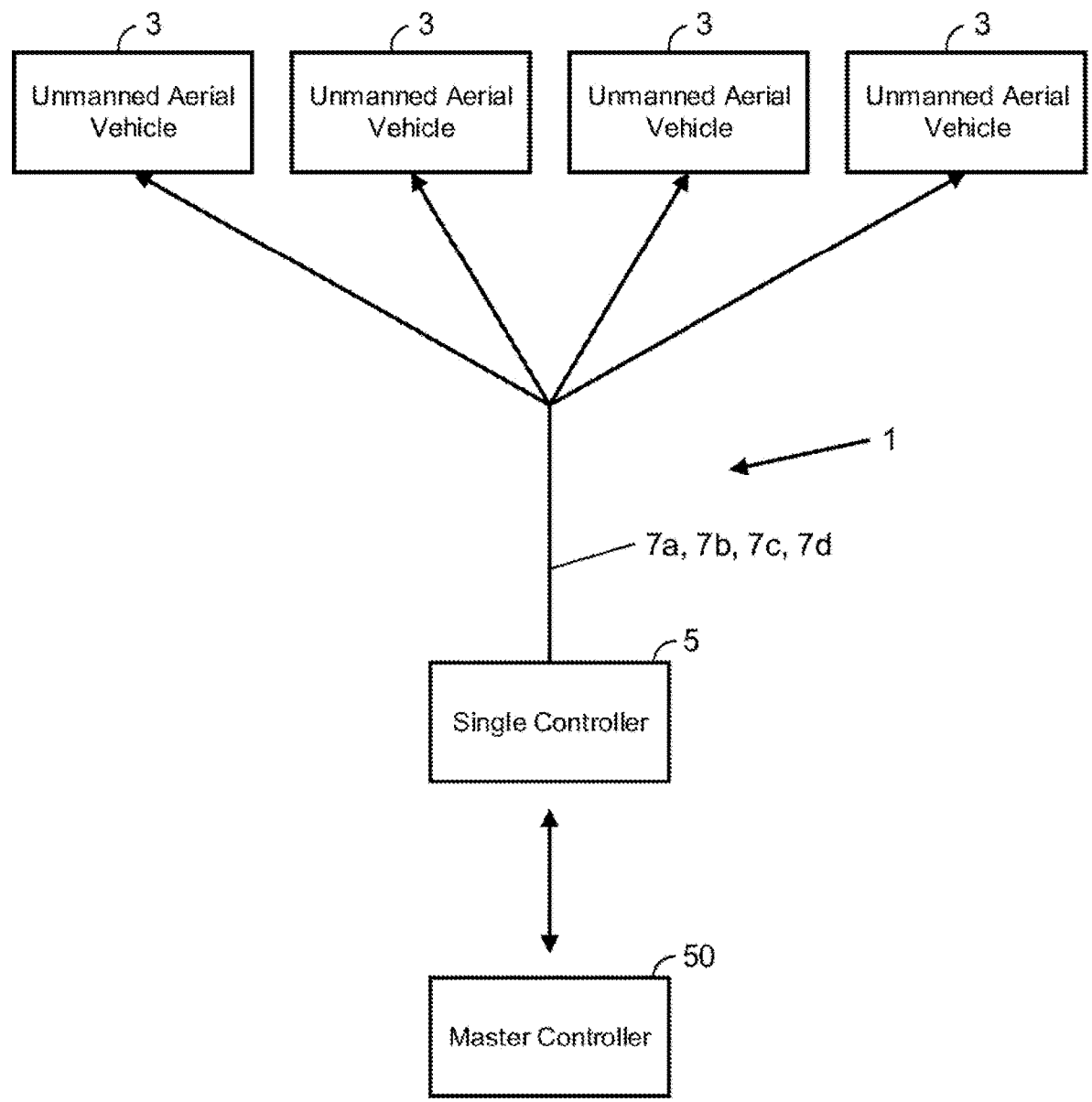
FIG. 5 is a block diagram illustrating a further embodiment of a system according to the present disclosure.

FIG. 5 is a block diagram illustrating a further embodiment of the present disclosure. In this embodiment the system 1 further comprises a master controller 50 which can communicate with the single controller 5. The master controller 50 can send commands to the single controller 5 which cause the single controller 5 to broadcast a selected command 7a-d to the plurality of unmanned aerial vehicles 3,30,300. For example, the master controller 50 can send a command to the single controller 5 which initiates the single controller 5 to send a command 7c to the aerial vehicles 3.

In a preferred embodiment the master controller 50 is a controller which is configured to control the motion of objects on a stage (e.g. the stage of a theatre), and the commands which the master controller 50 sends to the single controller 5 depend on the position which the objects occupy on the stage. For example, the master controller 50 may control the movement of a partition-wall on the stage; the master controller 50 may detect that the partition-wall is failing to move; to avoid the aerial vehicles 3 from colliding with the partition-wall the master controller 50 may instruct the single controller 5 to send a command 7d to the vehicle 3 which will it knows is assigned to respective flight paths each of which cause the respective vehicles 3,30,300 to land.

In another embodiment the user may control the single controller i.e. the single controller may be slaved to a user. The user can select which command(s) the single controller should broadcast, and then initiate the single controller to send the selected command. The user can operate the single controller to send commands which, for example, cause the aerial vehicles to start, stop, pause, to perform a default action, or to shut down the vehicle(s).

In the above-mentioned embodiments, the contents of the memory 21 of each unmanned aerial vehicle 3,30,300 will be pre-programmed prior to operating the system 1. In other words the flight plans 23a-d are predefined and are associated with respective commands 7a-d prior to operating the system 1. The sets of conditions 301a-d are also predefined and are also pre-programmed in the memories and are associated with respective flight plans 23a-d prior to operating the system 1.

For example, if the system 1 has three aerial vehicles 3 then, in the memory of the first aerial vehicle a first command 7a will be assigned to a first flight path 23a-d, and in the memory of the second aerial vehicle the same first command 7a will be assigned to a second flight path 23a-d which is different to the first flight path 23a-d, and in the memory of the third aerial vehicle the same first command 7a will be assigned to a third flight path 23a-d which is different to both the first and second flight path 23a-d.

For any one command 7a-d the flight plan 23a-d in the memory 21 of each aerial vehicle 3 which is associated with that command 7a-d must allow the vehicles to fly without collision. Thus, as mentioned for each command 7a-d the flight path assigned to that command 7a-d will differ between vehicles 3,30,300. For example, the flight plan 23a associated with a first command 7a in the memory 21 of a first vehicle 3 and the flight plan 23a associated with the first command 7a in the memory 21 of a second vehicle 3 will be different flight plans, so that the first and second vehicles will not be at the same position at the same point in time, thereby avoiding collision. Specifically, the spatial coordinates for corresponding discrete times specified in the flight plans 23a-d associated with the same command 7a in the memories 21 of the different vehicles 3,30,300, will be different between vehicles 3,30,300 in the system 1. This ensures that no two vehicles will be located at the same spatial coordinates as the same point in time. Thus, the vehicles of the system 1 can execute their respective flight plans 23a-d in response to a broadcasted command 7a-d, without the risk of collision with another vehicle. In the most preferred embodiment the spatial coordinates for corresponding discrete times specified in the flight plans 23a-d associated with the same command 7a in the memories 21 of the different vehicles 3,30,300, and also the spatial coordinates for corresponding discrete times specified in the flight paths of default flight plans of the different vehicles 3,30,300, will be different between vehicles 3,30,300 in the system 1.

Any of the above-mentioned systems can be used to perform a method of controlling a plurality of unmanned aerial vehicles according to an embodiment of the present disclosure. The method will comprise the steps of, using the single controller 5 to broadcast a command 7a-d to all of the plurality of unmanned aerial vehicles 3,30,300 so that each of the plurality of unmanned aerial vehicles 3,30,300 receive the same command 7a-d; and at each of the unmanned aerial vehicles 3,30,300, receiving at the processor 25 of that unmanned aerial vehicle 3,30,300 the command 7a-d which has been broadcasted by the single controller 5 to said plurality of unmanned aerial vehicles 3,30,300, and retrieving from a memory 21 of that aerial vehicle 3,30,300, the flight plan 23a-d which is assigned in the memory 21 to that command 7a-d which has been received at the processor 25, and operating the aerial vehicle 3,30,300 to follow the retrieved flight plans 23a-d.

Various modifications and variations to the described embodiments of the disclosure will be apparent to those skilled in the art without departing from the scope of the disclosure as defined in the appended claims. Although the disclosure has been described in connection with specific preferred embodiments, it should be understood that the disclosure as claimed should not be unduly limited to such specific embodiment. For example, it should be noted that in another embodiment the commands 7a-d which are broadcast by the single controller 5 are repeated through an array of repeaters or the vehicles repeat the received command.

In yet a further embodiment the broadcast command 7a-d further comprises a specification of the speed at which the vehicle 3 should travel the flight path of the flight plan 23a-d associated in the memory 21 of the vehicle with the broadcasted command 7a-d; in this embodiment the flight plans 23a-d stored in the memory of the vehicle do not need to contain velocity/speed data.

In yet a further embodiment the broadcast command 7a-d may further comprise a modifying parameter (such as a gain) which is applied to a component specified in the flight plan 23a-b associated in the memory 21 of the vehicle with the broadcasted command. For example the in an embodiment the broadcast command 7a-d further comprise a modifying parameter (which in this example is a gain) for a speed parameter which is defined in the flight plan 23a-b associated in the memory 21 of the vehicle with the broadcasted command 7*a-d*; for example the single controller 5 may broadcast a command 7*a* which further comprises a modifying parameter in the form of a gain of '2' which is to be applied to a speed parameter specified in the flight plan 23*a* which is associated in the memory 21 of the vehicle with the broadcasted command 7*a*; in this example instead of travelling the flight path specified in the flight plan 23*a* at the speed which is specified in the flight plan 23*a*, the vehicle will travel the flight path specified in the flight plan 23*a* at twice the speed (i.e. a gain of a factor or '2') which is specified in the flight plan 23*a*. In another example, the in an embodiment the broadcast command 7*a-d* further comprise a modifying parameter (which in this example is a gain) for a time parameter which is defined in the flight plan 23*a-b* associated in the memory 21 of the vehicle with the broadcasted command (the time parameter may be for example the maximum time in which the vehicle should take to travel the flight path specified in the flight plan 23*a-b*); for example the single controller 5 may broadcast a command 7*a* which further comprises a modifying parameter in the form of a gain of '2' which is to be applied to a time parameter specified in the flight plan 23*a* which is associated in the memory 21 of the vehicle with the broadcasted command 7*a*. Say, for example, the time parameter in this example is a time 10 seconds, which is specified in the flight plan 23*a*, which the time the vehicle should take to travel the flight path specified in the flight plan 23*a*; in other words in this example the vehicle should travel the flight path specified in the flight plan 23*a* in a time of 10 seconds. In this example instead of travelling the flight path specified in the flight plan 23*a* in a time of 10 second, as is specified in the flight plan 23*a*, the vehicle will travel the flight path specified in the flight plan 23*a* in a time of 20 seconds i.e. twice the maximum time specified in the flight plan 23*a*, corresponding to the gain of a factor of '2' which was provided in the sent command 7*a*. In this example in order to travel the flight path specified in the flight plan 23*a* in a time of 20 seconds instead of 10 seconds the vehicle may travel at half the speed which is specified in the flight plan 23*a*.

In yet a further embodiment the broadcast command 7*a-d* further comprises information about the conditions for the payload; in this embodiment the conditions for the payloads do not need to be stored in the memory 21 of the vehicle 3. In yet a further embodiment the vehicles 3 in the system have addresses which are used to identify the vehicles; and the broadcast command 7*a-d* further comprises one or more addresses corresponding to address of those vehicles in the system whom the command 7*a-d* is distained, and only those vehicles which have an address corresponding to an address in the broadcast command 7*a-d* will process the command 7*a-d*; in this embodiment the controller 5 can broadcast commands 7*a-d* to a subset of the vehicle in the system 1.

In yet a further embodiment the broadcast command 7*a-d* further comprises a modifier parameter for the conditions for a payload which are stored in the memory 21. For example, a condition stored in the memory 21 may specify a light intensity of 20 Lux for a light source which is provided on the vehicle; and the broadcasted command may further comprise a modifier parameter for that light intensity which is stored in the memory 21; for example the broadcasted command may further comprise a modifier parameter in the form of a gain value, for example, which is to be applied to the light intensity condition which is stored in memory. If for example the broadcasted command further comprises a gain of '2', then instead of operating the light source to emit light at 20 Lux, the gain of '2' is applied so that the light source is operated to emit a light at 40 Lux. In another example, the condition stored in the memory may be a light intensity profile for a light source onboard the vehicle: the broadcasted command may further comprise a modifier parameter such as a gain which is to be applied to that stored light intensity profile; for example the broadcasted command may further comprise a gain '0.5' which will be applied to the stored light intensity profile, in which case the light source on the vehicle will be operated to emit light according to the light intensity provide but with the light intensity being half that which is specified in the stored light intensity profile.

In an embodiment, each of the vehicles 3 begin execution of their respective flight plans, without delay, as soon as the broadcasted command is received by the processor 25 of that aerial vehicle 3 (for example the broadcasted command could be "START FLIGHT PLAN #5"). In a further embodiment the command 7*a-d* which is broadcasted by the controller 5 can also contain additional information such as a delay, which indicates when the vehicle should begin to execute the flight plan 23*a-d* associated in the memory with the command 7*a-d*. Preferably in this embodiment the vehicle comprises a clock which can be used to count the time elapsed since receipt of the broadcasted command. Preferably the processor 25 is configured to read (and preferably store) the time on the clock at which the broadcasted command was received at the vehicle, and to compare the current time on the clock of the vehicle with the time which was on the clock when the command was received (said time which was on the clock when the command was received may be stored in the memory of the vehicle). Alternatively, the clock may be configured to reset its time count to zero and start counting as soon as the broadcasted command has been received at the vehicle; preferably the clock is configured to reset its time count to zero and start counting as soon as the broadcasted command has been received by the processor 25 of the vehicle. Most preferably the processor 25 of each respective vehicle comprises a respective clock.

For example, the broadcasted command 7*a-d* may specify that the processor 25 should operate the vehicle to execute the flight plan 23*a-d* associated in the memory 21 with the command 7*a-d*, only '2.325' seconds after receiving the command 7*a-d* (for example the broadcasted command could be "START FLIGHT PLAN #6 IN 2.325 SECONDS"); in this case the clock of each respective vehicle 3 is configured to begin to count time, as soon as the broadcasted command is received by the processor 25. Importantly, in this example the execution of the flight plan 23*a-d* associated in their respective memories 21 with the command received by the processor 25, is only started by the receptive processor 25 of each respective vehicle 3, only when the clock of that respective vehicle 3 has counted 2.325 seconds.

In an embodiment, the clock of each respective vehicle 3 may be synchronized to a reference clock (such as an external reference clock). The reference clock could be provided by the single controller (for example, by including time information in the broadcasted commands such that the vehicle's clock can be synchronized to that time information), by a separate signal sent by the single controller (for example, a periodic broadcast signal indicating the current time), or by an external entity (for example by a Global Navigation Satellite System, a longwave time signal, or a separate timing signal generated by the controller). The synchronization of the respective clocks of all the vehicles with the reference clock may be done once only (in which case the clocks could slowly drift apart); alternatively the synchronization of the respective clocks of each respective vehicle with the reference clock may be done repeatedly or continuously (in which case clock drift can be eliminated).

In a further embodiment the command 7a-d which is broadcasted by the controller 5 can also contain additional information such as a start time, which indicates when the vehicle should begin to execute the flight plan 23a-d associated in the memory with the command 7a-d.

For example the broadcasted command 7a-d may specify that the processor 25 should operate the vehicle to execute the flight plan 23a-d associated in the memory with the command 7a-d, at a specific time; preferably in this example the vehicle and the single controller have synchronized clocks and the processor 25 operates the vehicle to start the execution of the flight plan 23a-d associated in the memory 21 with the command 7a-d, only when the clock of that vehicle has a time, equal to the time specified in the received command 7a-d. Said specific time provided in the command may be expressed with reference to a given clock (for example, using POSIX time, universal time, or the time at which the control station was started).

For example, a command broadcasted by the single controller may be "START FLIGHT PLAN #4 AT 1516292785.232 SECONDS". For each vehicle 3, the processor 25 reads the specific time mentioned in the broadcasted command, and compares said specific time with the time on its clock. Importantly, the execution of flight plan 23a-d associated in the respective memories 21 with the command, is only started by the receptive processor 25 of each respective vehicle 3, only when the clock of that respective vehicle 3 has a time which is equal to the specific time mentioned in the broadcasted command.

In one embodiment, instead of having a clock, the processor 25 of each vehicle 3 has access to an external clock signal that provides time to the processor 25. In this case the execution of the flight plan 23a-d associated in their respective memories 21 with the command, is only started by the receptive processor 25 of each respective vehicle 3, only when the external clock signal indicates a time which is equal to the specific time mentioned in the received command. Advantageously in this embodiment the vehicle is not required to have clock hardware.

In a further embodiment the processor 25 may be configured to determine if a start time specified in a broadcasted command which has been received, is within a predefined range. For example, the predefined range could be "Between time 1516292785.232 seconds and time 1516292785.432 seconds". For example, a predefined range may be determined by the processor 25; the predefined range may be dynamically determined by the processor 25 (i.e. the predefined range may differ from one instant to the next). For example, a predefined time range could be "between the current clock time and the current clock time plus '5' seconds". In this case, the processor 25 has access to a clock that measures time (such as a clock provided in the processor of the vehicle). Preferably, the clock is synchronized to a reference time (such as a system-wide time). Preferably, the processor of a vehicle reads the time on the clock at the beginning and at the end of every flight plan and records the times at the beginning and at the end of every flight plan. For example, a predefined time range may be calculated based on the end time of the previous flight plan (for example, if the previous flight plan ended at a time "30 seconds", the processor 25 may retrieve from memory a predefined threshold, for example "5.5" seconds, and calculate the predefined range as "between time 30.0 seconds and time 35.5 seconds" for example—in this example the processor 25 will only execute the flight plan which is associated in the memory of the vehicle with the command which it received, only if the start time specified in the received command is between times 30.0 seconds and time 35.5 seconds. In one embodiment the processor 25 is further configured so that, in response to determining that the start time which is specified in a broadcasted command is below the predefined range, the processor 25 will operate the aerial vehicle to perform a default action (such as landing). Most preferably the processor 25 is further configured so that, in response to determining that the start time which is specified in a broadcasted command is outside of the predefined range, the processor 25 will operate the aerial vehicle to perform a default action. For example, in one embodiment the processor 25 is further configured so that, in response to determining that the start time which is specified in a broadcasted command is above the predefined range, the processor 25 will operate the aerial vehicle to perform a default action (such as landing).

In a further embodiment the processor 25 may be configured to determine if a delay specified in a broadcasted command which has been received, is within a predefined range. For example, a predefined range can be of the form "Between 0 seconds and 10 seconds". It should be understood that the predefined range will preferably be stored in the memory of the vehicle (or a respective predefined range will preferably be stored in the respective memories of each vehicles). Most preferably the processor 25 is further configured so that, in response to determining that the delay which is specified in a broadcasted command is outside of the predefined range, the processor 25 will operate the aerial vehicle to perform a default action.

Furthermore, it should be understood that, in each of the embodiments described in this application, the memory of a vehicle may be a persistent memory, or volatile memory.

Figure 6:
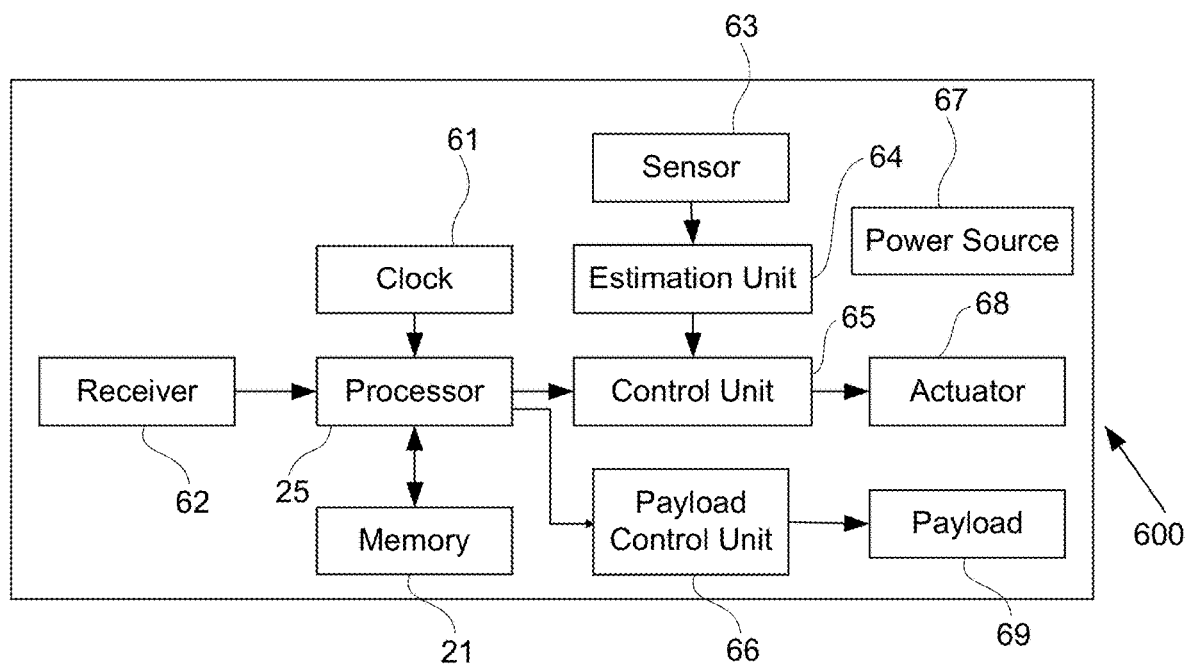
FIG. 6 is a block diagram illustrating an example of an unmanned aerial vehicle 600 according to a further aspect of the present disclosure.

FIG. 6 is a block diagram illustrating an example of an unmanned aerial vehicle 600 according to a further aspect of the present disclosure. The aerial vehicle 600 can be used in any of the systems of the present disclosure. The aerial vehicle 600 comprises, a memory 21 which stores at least one predefined flight plan each of which is assigned to a respective command; a control unit 65 which is configured such that it can control the flight of the vehicle so that the flight of the vehicle follows a flight plan; and a processor 25 which is configured such that it can (i) receive a command (for example a command which has been broadcasted by the single controller 5), (ii) retrieve from its memory 21 the flight plan which is assigned in the memory to that command, (iii) send the retrieved flight plan to the control unit 65; and wherein the control unit is configured such that it controls the flight of the vehicle so that the flight of the vehicle follows said flight plan which it receives from said processor 25.

Said aerial vehicle 600 could be used in the system of FIG. 1. In other words one or more of said aerial vehicles in any of the system embodiments described above could have the features of said aerial vehicle 600.

It is understood that the processor 25 of said aerial vehicle 600 may comprise any one or more of the features of the processor 25 of any of the embodiments described in this application. Some examples include, but are not limited to, the follow:

The processor 25 of the aerial vehicle 600 may be further configured to carry out a check to determine if the aerial vehicle can follow the retrieved flight plan without collision with an object, and if the processor determines that the aerial vehicle cannot follow the retrieved flight plan without collision then the processor will perform a default action, such as sending a default flight plan to the control unit 65.

The processor 25 of the aerial vehicle 600 may be further configured to carry out a check to determine if the aerial vehicle 600 has sufficient resources to follow the retrieved flight plan, and if the processor determines that the aerial vehicle has insufficient resources to follow the retrieved flight plan then the processor will perform a default action.

The processor 25 of the aerial vehicle 600 may be further configured to detect if no command has been received within a predefined time period, and in response to having not received a command within the predefined time period the processor will perform a default action.

The processor 25 of the aerial vehicle 600 may be further configured to determine if a start time or delay time specified in a command which has been received at the vehicle, is within a predefined range; and the processor is further configured to perform a default action if it is determined that the start time or delay time specified in a received command is outside of said predefined range.

The processor 25 of the aerial vehicle 600 may be further configured to determine whether a command that it has been received is valid based on the last flight plan which the vehicle executed. Specifically, the processor 25 may be configured to compared starting conditions which are specified in the retrieved flight plan with end conditions specified in the flight plan which the aerial vehicle last executed; the processor 25 then sends the retrieved flight plan to the control unit 65 only if the starting conditions specified in the retrieved flight plan are equal to the end conditions specified in the flight plan which the aerial vehicle last executed, otherwise the processor 25 performs a default action.

Likewise, the memory 21 of said aerial vehicle 600 may comprise any one or more of the features of the memory 21 of any of the embodiments described in this application. For example, the memory 21 may have any one or more of the features of the memory 21 of the vehicles in the embodiments shown in FIG. 2, FIG. 3, and/or FIG. 4. For example, the memory 21 of said aerial vehicle 600 may store flight plans 23*a-d*, conditions 301*a-d*, and/or other parameters.

In one example the memory 21 of the aerial vehicle 600 further stores a plurality of sets of parameters for the aerial vehicle 600, each set of parameters is assigned to respective flight plan stored in memory 21. In this example, the processor 25 may be configured to retrieve from the memory 21 the flight plan which is assigned in the memory to the command which the vehicle has received, and also retrieve from the memory 21 the set of parameters assigned to said flight plan. Preferably the processor 25 adjusts its own configuration (or the control unit configuration) according to the retrieved parameters. For example, the processor 25 may adjust parameters of the control law (e.g. PID control law) which the control unit 65 is designed to execute to control the flight of the aerial vehicle; such as, for example, the proportional gain, integral gain, derivative gain of the control law which the control unit 65 is designed to execute.

The aerial vehicle 600 further comprises a receiver 62, which can receive a command (for example a command that has been broadcasted by the single controller 5 as described in other embodiments), and can pass the received command to the processor 25 for processing. The receiver 62 is preferably operably connected to the processor 25 so that the receiver can pass received broadcasted commands to the processor 25 for processing. It should be understood that the receiver 62 of the aerial vehicle 600 may have any one or more of the features of the receiver of any of the embodiments described in this application.

Preferably the aerial vehicle 600 further comprises a clock 61. Most preferably the processor 25 further comprises a clock which can measure time. The clock 61 of the vehicle is preferably operably connected to the processor 25, so that the processor 25 can read the time measurement on the clock or so that the clock can send its time measurement to the processor 25. should be understood that the clock 61 of the aerial vehicle 600 may have any one or more of the features of the clock of any of the embodiments described in this application (for example, the clock of the aerial vehicle 600 may be synchronized to a reference clock).

The aerial vehicle 600 comprises at least one sensor 63 which can measure physical quantities and generate and subsequently output one or more sensors signals that contain measurement data. The at least one sensor may be structured and arranged to (a) sense the state of a subsystem or component and to output sensor signals containing measurement data representative of a state of subsystem or a component which has been sensed (e.g. output sensor signals containing measurement data representative of the state of an actuator such as linear position or rotational position, and/or output sensor signals containing measurement data representative of the state of power source such as temperature or state of charge), or (b) sense the motion of one or more subsystems and to output sensor signals containing measurement data representative of the motion of one or more subsystems (e.g. rotational speed of an actuator), or (c) sense the motion of the aerial vehicle and to output sensor signals containing measurement data representative of the motion of the aerial vehicle.

In an embodiment the aerial vehicle 600 may comprise one or more interoceptive sensors which are configured to sense an internal quantity (such as temperature) of one or more components (such as actuators) in the aerial vehicle 600. For example, the aerial vehicle 600 may comprise, a heat sensor which is configured to sense the temperature of a motor and to output sensor signals containing measurement data representative of the temperature of the motor and/or a current sensor configured to sense the electric current in a wire and to output sensor signals containing measurement data representative of the current.

The aerial vehicle 600 may further comprise one or more exteroceptive sensors. Preferably the one or more exteroceptive sensors are configured to sense a state (i.e. a relative position, relative orientation, or relative velocity) of a system, with respect to an external reference frame. For example, the aerial vehicle 600 may further comprise one or more exteroceptive sensors which are configured to sense a relative position and/or relative orientation, and/or relative velocity of the aerial vehicle 600 with respect to an external reference frame and to output sensor signals containing measurement data representative of the relative position and/or relative orientation, and/or relative velocity of the aerial vehicle 600. It should be understood that the external reference frame may be a predefined reference frame.

In a further embodiment the aerial vehicle 600 may comprise a vision sensor (e.g. a camera) which is configured to sense the distance from the aerial vehicle 600 to an obstacle and to output sensor signals containing measurement data representative of the distance from the aerial vehicle 600 to the obstacle; and/or a magnetometer sensor which is configured to sense the direction of the Magnetic North Pole and to output sensor signals containing measurement data representative of the direction of the Magnetic North Pole. Exteroceptive sensors can be particularly useful for autonomous flight of the aerial vehicle 600.

In another embodiment the aerial vehicle 600 may comprise one or more micro-sensors, such as micro-electromechanical systems (MEMS), and/or one or more piezoelectric systems, which are used as sensors. For example, the aerial vehicle 600 may comprise any one or more of: MEMS gyroscopes, MEMS accelerometers, piezoelectric gyroscopes, and/or piezoelectric accelerometers, all of which can be usefully employed for the control of the flight of the aerial vehicle 600. In some embodiments the use of micro-sensors allows using one or more inertial measurement units (IMUs), which each combine multiple gyroscopes and accelerometers or use multiple-axis gyroscopes and accelerometers.

The aerial vehicle 600 may further comprise an estimation unit 64. The estimation unit 64 is preferably configured to implement state estimation algorithms (based on the sensors signals output by any one or more of said above-mentioned sensors) to estimate the state of the aerial vehicle 600. In such as case the one or more sensors are configured to output their sensor signals to the estimation unit. The algorithms used by the estimation unit are estimation algorithms that are well-known in the art; examples of such methods include Kalman filtering; extended Kalman filtering; particle filtering; unscented Kalman filtering; and complementary filtering. In some embodiments a state estimate includes an estimate of the aerial vehicle's rotation and an estimate of the vehicle's angular velocity. The estimation unit may be configured to estimate both a rotational state (e.g. attitude, angular velocity) and a translational state (e.g. position, velocity) of the vehicle. Those estimates can be usefully employed for the control of the flight of the aerial vehicle. For example, an estimate of the rotational state of the aerial vehicle can be used by an attitude controller (implemented for example in the control unit 65) to stabilize and control the attitude of the vehicle.

As mentioned the aerial vehicle 600 further comprise a control unit 65 which is configured such that it can control the flight of the vehicle so that the flight of the vehicle follows a flight plan. The control unit receives the retrieved flight plan from the processor 25 and the state estimate from the estimation unit 64 and operates one or more actuators 68 (which are typically configured to actuate flight effectors) of the aerial vehicle 600 to control the flight of the aerial vehicle so that the aerial vehicle 600 follows the retrieved flight plan. The control unit is configured to implement one or more known control laws, in order to control the flight of the vehicle so that it executes the retrieved flight plan. Examples of such control laws include any one or more of, PID control; model predictive control; sliding mode control; full state feedback; and backstepping control. Depending on the control law, the control unit may use a vehicle state estimate which has been determined by the estimation unit, to control the aerial vehicle 600. For example, the estimation unit may be configured to estimate the aerial vehicle's attitude and to estimate the aerial vehicle's angular velocity; the control unit may be configured to receive said estimate of the aerial vehicle's attitude and said estimate of the aerial vehicle's angular velocity from the estimate unit and to use said estimates to maintain the aerial vehicle 600 at a predefined attitude, e.g. in an attitude controller. In another example the control unit is configured to compute different sets of control signals for different sets of actuators (e.g. a rotary motor and a servo motor), and to send those computed control signal to each respective set of actuators.

In another example, the aerial vehicle 600 may further comprise one or more payloads 69. The aerial vehicle 600 may further comprise a payload control unit 66 which can configure one or more of said payloads to meet certain conditions.

Preferably in this example there is further stored in the memory 21 of the aerial vehicle 600, a set of conditions for said one or more payloads 69. Most preferably the set of conditions is assigned to a flight plan stored in memory 21. In this case the processor 25 is preferably further configured to, retrieve from the memory 21 the set of conditions assigned to the flight plan which is assigned in the memory to that command which has been received, and to send the retrieved set of conditions to the payload control unit 66; the payload control unit then configures the one or more payloads to meet the conditions specified in the retrieved set of conditions. The set of conditions may comprise any one or more selected from the group comprising, light intensity for a light source provided on the aerial vehicle; an orientation for a light source provided on the aerial vehicle; a color for a light source provided on the aerial vehicle; whether a camera provided on the aerial vehicle should record still images, or whether the camera should record video, or whether the camera should be turned off; and/or a motion profile for an actuator provided on the aerial vehicle. It is further understood that the conditions stored in memory 21 may have any one or more of the features of the conditions described in any of the embodiments described above.

The one or more payloads provided on the vehicle may take any suitable form; for example the one or more payloads may comprise, one or more light sources, and/or a camera, and/or a housing (which can store confetti for example) which has a door which can be selectively opened to release the stored confetti, and/or an actuator. The sets of conditions may specify light intensity/light intensities profile for the one or more light sources provided on the vehicle; and/or orientation profile for a light source provided on the aerial vehicle; and/or color profile for a light source provided on the aerial vehicle; and/or may specify if a camera provided on the aerial vehicle should record still images, or whether the camera should record video, or whether the camera should be turned on or off, and/or may specify that the door of the housing should be opened; and/or a motion profile for an actuator provided on the aerial vehicle.

The aerial vehicle 600 may comprises one or more power sources 67. The one or more power source(s) may take any suitable configuration. Examples for suitable power sources 67 include batteries, accumulators, internal combustion engines, turbines, and power capacitors. Further examples include other electric and nonelectric power sources. The power source(s) is configured to supply power to one or more of the sensor(s), actuator(s), processor 25, and other components of the aerial vehicle 600 which require power.

It should be understood that in the most preferable embodiment, any one or more of said clock 61, the receiver 62, the sensor 63, the estimation unit 64, the payload control unit 66, and/or the control unit 65, may be integral to the processor 25. In another embodiment any one or more of said clock 61, the receiver 62, the sensor 63, the estimation unit 64, the payload control unit 66, and/or the control unit 65 are operably connected to the processor 25.

The invention claimed is:
1. A system comprising:
a plurality of unmanned aerial vehicles; and
a single controller for controlling said plurality of unmanned aerial vehicles, wherein the single controller is configured such that it can broadcast a command from a transmitter to all of the plurality of unmanned aerial vehicles within range of the transmitter;

wherein the command comprises a flight plan identifier;

wherein each of the unmanned aerial vehicles comprises a memory which stores a plurality of predefined flight plans and a respective assigned flight plan identifier for each respective predefined flight plan;

wherein each of the plurality of predefined flight plans of each of the unmanned aerial vehicles comprises a flight path that specifies a plurality of spatial coordinates for an aerial vehicle to occupy; and wherein each of the unmanned aerial vehicles comprises a processor which can:

(i) receive the command which has been broadcast from the transmitter;

(ii) use the flight plan identifier, of said received command, to determine which of said stored plurality of predefined flight plans to retrieve from said memory by retrieving from the memory of that aerial vehicle the flight plan which has been assigned in the memory to a flight plan identifier which corresponds to the flight plan identifier of the received command;

(iii) carry out a check to determine if the aerial vehicle can follow the retrieved flight plan without collision with an object; and (iv) operate the aerial vehicle to follow the retrieved flight plan only if the processor determines that the aerial vehicle can follow the retrieved flight plan without collision.

2. A system according to claim 1 wherein, in at least some of the unmanned aerial vehicles there is further stored in the memory of that unmanned aerial vehicle, a set of conditions for one or more payloads provided on said unmanned aerial vehicle, and wherein the set of conditions are assigned to a flight plan stored in memory; and wherein the processor is further configured to, retrieve from the memory the set of conditions assigned to the flight plan which that vehicle is about to follow, and to operate the one or more payloads on said unmanned aerial vehicle so that they meet the conditions specified in the retrieved set of conditions.

3. A system according to claim 2 wherein the set of conditions may comprise any one or more selected from the group comprising, light intensity for a light source provided on the aerial vehicle; an orientation for a light source provided on the aerial vehicle; a color for a light source provided on the aerial vehicle; whether a camera provided on the aerial vehicle should record still images, or whether the camera should record video, or whether the camera should be turned off; and/or a motion profile for an actuator provided on the aerial vehicle.

4. A system according to claim 1 wherein the processor is further configured to operate the aerial vehicle to perform a default action if the processor determines that the aerial vehicle cannot follow the retrieved flight plan without collision.

5. A system according to claim 1 wherein the single controller is configured such that it can broadcast a command from a single transmitter to all of the plurality of unmanned aerial vehicles within range of the single transmitter.

6. A system according to claim 1 wherein the spatial coordinates for corresponding discrete times specified in the flight plans assigned to the same flight plan identifier in the memories of the different vehicles are different between vehicles, so that no two vehicles will be located at the same spatial coordinates at the same point in time when the vehicles are operated to follow the retrieved flight plan in response to receiving the broadcasted command.

7. A system according to claim 1, wherein the single controller is configured to broadcast a predefined series of commands from a single transmitter, wherein in each predefined series, for adjacent commands in the predefined series the end conditions specified in the flight plan assigned in the memory to one of said commands are equal to start conditions specified in the flight plan assigned in the memory to the next command in said series.

8. An aerial vehicle according to claim 1 wherein each of the plurality of predefined flight plans of each of the unmanned aerial vehicles comprises a flight path that specifies a plurality of spatial coordinates for an aerial vehicle to occupy, wherein each spatial coordinate is associated with a discrete time in a time period; and wherein each of the plurality of predefined flight plans of each of the unmanned aerial vehicles is retrievable from said memory and executable in response to a received broadcast command comprising its respectively assigned flight plan identifier.

9. A system according to claim 1 wherein the single controller is configured to broadcast at least one command from a single transmitter to said plurality of unmanned aerial vehicles within range of the single transmitter, wherein said at least one command defines a choreography for the plurality of unmanned aerial vehicles based on the predefined flight plans stored in the memories of the plurality of unmanned aerial vehicles.

10. A system according to claim 9, wherein the single controller is configured to broadcast, consecutively, a plurality of commands, wherein said plurality of commands define a choreography for the plurality of unmanned aerial vehicles based on the predefined flight plans stored in the memories of the plurality of unmanned aerial vehicles.

11. A system according to claim 10 wherein the single controller is configured to broadcast a next command before the plurality of unmanned aerial vehicles have completed their respective flight plans assigned to the last command which the single controller broadcast.

12. A system according to claim 1 wherein the processor is further configured to carry out a check to determine if the aerial vehicle has sufficient resources to follow the retrieved flight plan, and if the processor determines that the aerial vehicle has insufficient resources to follow the retrieved flight plan then the processor will operate the aerial vehicle to perform a default action.

13. A system according to claim 1 wherein the processor is further configured to detect if no command has been retrieved within a predefined time period, and in response to having not received a command within the predefined time period the processor will operate the aerial vehicle to perform a default action.

14. A system according to claim 4 wherein the default action comprises following a default flight plan.

15. A system according to claim 14, wherein the default flight plan comprises a flight path which specifies a plurality of spatial coordinates for an aerial vehicle to occupy, wherein each spatial coordinate is associated with a discrete time in a time period, and wherein the spatial coordinates specified in the default flight plans for corresponding discrete times differs between vehicles, and wherein the spatial coordinates specified in the default flight plans differ to the spatial coordinates for corresponding discrete times specified in said flight plans stored in the memories of the other vehicles in the system, so that no two vehicles will be located at the same spatial coordinates at the same point in time when executing their default flight plan or retrieved flight plan.

16. A system according to claim 14 wherein the default flight plan comprises the landing of the unmanned aerial vehicle.

17. A system according to claim 15, wherein the spatial coordinates defining a start of the default flight plan are equal to the spatial coordinates defining a start of the retrieved flight plan, and the spatial coordinates defining an end of the default flight plan are equal to the spatial coordinates defining an end of the retrieved flight plan.

18. A system according to claim 1 wherein, for each respective flight plan identifier, the flight plans assigned in the memories of all the unmanned aerial vehicles to that flight plan identifier have the same time duration.

19. A system according to claim 18 wherein a flight plan of at least one unmanned aerial vehicle includes a period wherein the unmanned aerial vehicle hovers in a single position for a period of time so that said flight plan has the same time duration as the flight plans followed by the other unmanned aerial vehicles.

20. A system according to claim 1 wherein each of the unmanned aerial vehicles comprise a memory which stores a plurality of flight plan sets, each flight plan set comprising a plurality of predefined flight plans each of which is assigned to a respective command; and wherein the single controller is further configured such that it can send a command, which is addressed to a single unmanned aerial vehicle, which identifies one of the set of flight plans which that single unmanned aerial vehicle is to use.

21. A system according to claim 20 wherein the plurality of unmanned aerial vehicles all have the same plurality of flight plan sets, and that the number of flight plan sets is at least equal to the number of unmanned aerial vehicles in the system.

22. A system according to claim 1 wherein the system further comprises a master controller which can communicate with the single controller, and wherein the master controller can send commands to the single controller which cause the single controller to broadcast a selected command to the plurality of unmanned aerial vehicles.

23. A system according to claim 22 wherein the master controller is a controller which is configured to control the motion of objects on a stage, and wherein the commands which the master controller send to the single controller depend on the position which the objects occupy on the stage.

24. A system according to claim 1 wherein the controller is further configured to send a localization signal which can be used to determine the distance between said single controller and each vehicle.

25. A system according to claim 1 wherein a command broadcasted by the single controller further comprises a start time or a delay.

26. A system according to claim 1 wherein the processor of each vehicle is further configured to determine if a start time or delay time specified in a broadcasted command which has been received at the said vehicle, is within a predefined range; and wherein the processor is further configured to operate the vehicle to perform a default action if it is determined that the start time or delay time specified in a broadcasted command is outside of said predefined range.

27. A method of controlling a plurality of unmanned aerial vehicles, the method comprising:

using a single controller to broadcast a command from a transmitter to all of the plurality of unmanned aerial vehicles within range of the transmitter, wherein:
the command comprises a flight plan identifier;
each of the plurality of unmanned aerial vehicles comprises a memory which stores a plurality of predefined flight plans and a plurality of flight plan identifiers, wherein each of the plurality of predefined flight plans is assigned to a respective flight plan identifier; and
each of the plurality of predefined flight plans of each of the unmanned aerial vehicles comprises a flight path that specifies a plurality of spatial coordinates for an aerial vehicle to occupy; and at each of the unmanned aerial vehicles,
receiving at a processor of that unmanned aerial vehicle the command which has been broadcast from the transmitter;
retrieving from the memory of that aerial vehicle the flight plan which is assigned in the memory to a flight plan identifier which corresponds to the flight plan identifier of the received command;
carrying out a check to determine if the aerial vehicle can follow the retrieved flight plan without collision with an object; and
operating the aerial vehicle to follow the retrieved flight plan only if the processor determines that the aerial vehicle can follow the retrieved flight plan without collision.

28. A method of controlling a plurality of unmanned aerial vehicles according to claim 27 further comprising operating the aerial vehicle to perform a default action if the processor determines that the aerial vehicle cannot follow the retrieved flight plan without collision.

29. A method of controlling a plurality of unmanned aerial vehicles according to claim 27, wherein, in at least some of the unmanned aerial vehicles there is further stored in the memory of that unmanned aerial vehicle, a set of conditions for one or more payloads provided on said unmanned aerial vehicle, and wherein the set of conditions are assigned to a flight plan stored in memory, the method further comprising:

retrieving from the memory the set of conditions assigned to the flight plan which that vehicle is about to follow, and
operating the one or more payloads on said unmanned aerial vehicle so that they meet the conditions specified in the retrieved set of conditions.

30. A method of controlling a plurality of unmanned aerial vehicles according to claim 29, wherein the set of conditions may comprise any one or more selected from the group comprising, light intensity for a light source provided on the aerial vehicle; an orientation for a light source provided on the aerial vehicle; a color for a light source provided on the aerial vehicle; whether a camera provided on the aerial vehicle should record still images, or whether the camera should record video, or whether the camera should be turned off; and/or a motion profile for an actuator provided on the aerial vehicle.

31. An aerial vehicle which comprises:
a memory which stores at least two predefined flight plans and at least two flight plan identifiers, wherein:
each predefined flight plan is assigned in memory to a respective flight plan identifier;

each of the at least two predefined flight plans comprises a flight path that specifies a plurality of spatial coordinates for the aerial vehicle to occupy;

a control unit which is configured such that it can control the flight of the aerial vehicle so that the flight of the aerial vehicle follows a flight plan; and a processor which is configured such that it can
  (i) receive a command which has been broadcasted from a transmitter to multiple aerial vehicles, wherein the command comprises a flight plan identifier;
  (ii) retrieve from its memory the flight plan which is assigned in the memory to a flight plan identifier which corresponds to the flight plan identifier of the command;
  (iii) send the retrieved flight plan to the control unit; and
  (iv) carry out a check to determine if the aerial vehicle can follow the retrieved flight plan without collision with an object, wherein the control unit is configured to control the flight of the aerial vehicle so that the flight of the aerial vehicle follows said flight plan which it receives from said processor only if the processor determines that the aerial vehicle can follow the retrieved flight plan without collision.

32. An aerial vehicle according to claim 31 wherein the control unit is configured to control the flight of the aerial vehicle so that the flight of the aerial vehicle follows a default action if the processor determines that the aerial vehicle cannot follow the retrieved flight plan without collision.

33. An aerial vehicle according to claim 31 wherein the aerial vehicle further comprises one or more payloads, and
  wherein there is further stored in the memory of the aerial vehicle, a set of conditions for one or more payloads provided on said aerial vehicle, and wherein the set of conditions are assigned to a flight plan stored in memory; and
  wherein the processor is further configured to, retrieve from the memory the set of conditions assigned to the flight plan which that vehicle is about to follow, and the control unit is further configured operate the one or more payloads on said aerial vehicle so that they meet the conditions specified in the retrieved set of conditions.

34. An aerial vehicle according to claim 33 wherein the set of conditions may comprise any one or more selected from the group comprising, light intensity for a light source provided on the aerial vehicle; an orientation for a light source provided on the aerial vehicle; a color for a light source provided on the aerial vehicle; whether a camera provided on the aerial vehicle should record still images, or whether the camera should record video, or whether the camera should be turned off; and/or a motion profile for an actuator provided on the aerial vehicle.

35. An aerial vehicle according to claim 31 further comprising a clock.

36. An aerial vehicle according to claim 31 wherein the processor is configured such that it can receive a command which has been broadcasted from a single transmitter to multiple aerial vehicles.

37. An aerial vehicle according to claim 31, wherein each spatial coordinate is associated with a discrete time in a time period, and wherein each of the at least two predefined flight plans is retrievable from said memory and executable in response to a received broadcast command comprising its respectively assigned flight plan identifier.

38. A system according to claim 1, wherein the single controller is configured such that it can broadcast a command from a plurality of transmitters to the unmanned aerial vehicles within range of at least one of said plurality of transmitters.

* * * * *